(12) United States Patent
Wang et al.

(10) Patent No.: US 11,530,775 B2
(45) Date of Patent: Dec. 20, 2022

(54) METHOD AND SYSTEM FOR ADAPTIVE GIMBAL

(71) Applicant: SZ DJI OSMO TECHNOLOGY CO., LTD., Shenzhen (CN)

(72) Inventors: Yan Wang, Shenzhen (CN); Guoqing Li, Shenzhen (CN); Jingyuan Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/168,932

(22) Filed: Feb. 5, 2021

(65) Prior Publication Data

US 2021/0180744 A1 Jun. 17, 2021

Related U.S. Application Data

(63) Continuation of application No. 16/200,862, filed on Nov. 27, 2018, now Pat. No. 10,914,418, which is a (Continued)

(51) Int. Cl.
*F16L 3/00* (2006.01)
*F16M 11/20* (2006.01)
(Continued)

(52) U.S. Cl.
CPC ......... *F16M 11/205* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 8,087,315 B2 * 1/2012 Goossen .............. F16M 11/041
74/5.22
8,903,568 B1 * 12/2014 Wang ................... G05D 1/0038
701/2
(Continued)

FOREIGN PATENT DOCUMENTS

CN 201429796 Y 3/2010
CN 103939718 A 7/2014
(Continued)

OTHER PUBLICATIONS

The World Intellectual Property Organization (WIPO) International Search Report and Written Opinion for PCT/CN2016/084175 Feb. 8, 2017 8 pages.

*Primary Examiner* — Steven M Marsh
(74) *Attorney, Agent, or Firm* — Anova Law Group, PLLC

(57) ABSTRACT

A method for detecting a payload on a carrier configured to support the payload includes obtaining a obtaining at least one motion characteristic of the carrier. The at least one motion characteristic is indicative of a coupling state between the carrier and the payload. The method further includes assessing the coupling state between the carrier and the payload based on the at least one motion characteristic. Assessing the coupling state between the carrier and the payload includes at least one of assessing whether the payload is coupled to the carrier or assessing whether the payload is correctly mounted at the carrier.

20 Claims, 13 Drawing Sheets

Related U.S. Application Data continuation of application No. PCT/CN2016/084175, filed on May 31, 2016.

(51) Int. Cl.
| | | |
|---|---|---|
| *F16M 11/18* | (2006.01) | |
| *B64D 47/08* | (2006.01) | |
| *F16M 11/10* | (2006.01) | |
| *G03B 17/56* | (2021.01) | |
| *F16M 11/04* | (2006.01) | |
| *F16M 13/02* | (2006.01) | |
| *B64C 39/02* | (2006.01) | |
| *F16M 11/12* | (2006.01) | |
| *F16M 13/04* | (2006.01) | |
| *G03B 15/00* | (2021.01) | |

(52) U.S. Cl.
CPC ........... *F16M 11/041* (2013.01); *F16M 11/10* (2013.01); *F16M 11/105* (2013.01); *F16M 11/123* (2013.01); *F16M 11/18* (2013.01); *F16M 11/2071* (2013.01); *F16M 13/02* (2013.01); *F16M 13/04* (2013.01); *G03B 17/561* (2013.01); *B64C 2201/127* (2013.01); *F16M 2200/041* (2013.01); *F16M 2200/044* (2013.01); *G03B 15/006* (2013.01)

(56) References Cited

U.S. PATENT DOCUMENTS

| | | | |
|---|---|---|---|
| 9,580,173 B1* | 2/2017 | Burgess | B64D 1/22 |
| 2004/0173726 A1* | 9/2004 | Mercadal | F16M 11/12 |
| | | | 248/660 |
| 2004/0174453 A1 | 9/2004 | Okada et al. | |
| 2005/0125142 A1 | 6/2005 | Yamane | |
| 2008/0035797 A1 | 2/2008 | Defendini et al. | |
| 2009/0115850 A1 | 5/2009 | Nakamura | |
| 2009/0125223 A1 | 5/2009 | Higgins | |
| 2009/0326816 A1 | 12/2009 | Park et al. | |
| 2010/0318336 A1 | 12/2010 | Falangas | |
| 2013/0050487 A1 | 2/2013 | Omer et al. | |
| 2013/0338859 A1 | 12/2013 | Yamasaki | |
| 2014/0034775 A1* | 2/2014 | Hutson | B64C 27/006 |
| | | | 244/17.17 |
| 2014/0252156 A1 | 9/2014 | Hiebl et al. | |
| 2016/0198088 A1* | 7/2016 | Wang | H04N 5/23264 |
| | | | 348/36 |

FOREIGN PATENT DOCUMENTS

| | | |
|---|---|---|
| CN | 203868619 U | 10/2014 |
| CN | 105227824 A | 1/2016 |
| CN | 205246884 U | 5/2016 |

\* cited by examiner

METHOD AND SYSTEM FOR ADAPTIVE GIMBAL

CROSS-REFERENCE TO RELATED APPLICATIONS

This application is a continuation of U.S. application Ser. No. 16/200,862, filed on Nov. 27, 2018, which is a continuation of International Application No. PCT/CN2016/084175, filed on May 31, 2016, the entire contents of both of which are incorporated herein by reference.

BACKGROUND

In many applications, payloads need to be stabilized so that they are not affected by vibrations and unwanted movements. One technology used to stabilize a payload mounted on a movable platform (such as aircrafts, human, vehicle) is active stabilization. Typically, active stabilization systems such as an Inertial Stabilization Platform (ISP) or a gimbal system use motors to counteract any vibration or undesired movements detected by motion sensors. From a control perspective, such gimbal system is built as a servo motion control system and the dynamic performance of the system may be affected by the physical characteristics of the payloads. In some situations, it would be difficult to use a fixed set of control parameters to control payloads having different physical characteristics such as moment of inertia. For instance, in the absence of a payload, a low moment of inertial of the system may result in the system experiencing uncontrollable oscillation, which can damage the mechanical system. In another instance, an imbalanced mounting of the payload may give rise to a large moment of inertia which may cause a motor overloads, which can damage the motor.

SUMMARY

Therefore there exists a need for apparatus and methods that can allow a stabilizing platform of a carrier to automatically adapt to different types of payloads, and provide protect to the platform from damage caused by improper mounting of payloads. The present disclosure addresses this need and provides related advantages as well.

In one aspect, the present disclosure provides a method or controlling a carrier configured to support a plurality of different types of payload. In practice, the method may comprise: obtaining at least one motion characteristic of the carrier when the carrier is supporting a type of payload from said plurality, wherein said motion characteristic is indicative of the type of payload being supported by the carrier; and selecting a set of control parameter(s) from a plurality of different sets of control parameter(s) based on said motion characteristic, wherein the selected set of control parameter(s) is suitable for controlling movement of the carrier for the type of payload being supported by the carrier, and wherein each individual set of control parameter(s) is suitable for controlling the carrier that supports a type of payload that is different from another payload in said plurality of payloads.

In some embodiments, the set of control parameters(s) may be automatically selected from the plurality of different sets of control parameter(s) with aid of one or more processors without any user input. In some embodiments, the set of control parameter(s) is selected from the plurality of different sets of control parameter(s) with aid of one or more processors when the carrier supporting the type of payload from said plurality of different types is in motion. The method of controlling the carrier may comprise effecting movement of the carrier based in part on the selected set of control parameter(s). The movement of the carrier comprises an angular displacement, an angular velocity, and/or an angular acceleration of the carrier and the movement of the carrier is effected relative to a movable object to which the carrier is operably coupled. In some embodiments, the movable object is a handheld support member and the carrier is operably coupled to the movable object via a releasable coupling. In some embodiments, the selected set of control parameter(s) is suitable for effecting the movement of the carrier to achieve a predefined level of actuation control and/or response speed when the carrier is supporting the type of payload from said plurality of different types of payload.

In some embodiments, the plurality of different types of payload can be controlled by the carrier are different in at least one of the following aspects: (i) mass, (ii) center of gravity, (iii) size, (iv) shape, (v) payload function, or (vi) type of material of the payload. The plurality of different types of payload comprise different types of imaging devices. In some embodiments, the different types of imaging devices are configured to be operably coupled to the carrier in different configurations.

In some embodiments, the at least one motion characteristic utilized in the present disclosure may comprise a vibration motion of the carrier. In some cases, the vibration motion can be obtained using one or more inertial sensors located on the carrier. The vibration motion of the carrier is generated by initially effecting movement of the carrier using a set of reference control parameter(s). In some cases, the vibration motion of the carrier is indicative of a torque response of the carrier for the set of reference control parameter(s) and the set of control parameter(s) is selected from the plurality of different sets of control parameter(s) based on the torque response of the carrier. The set of reference control parameter(s) are used to assess the type of payload that is being supported by the carrier. In some embodiments, the plurality of different sets of control parameter(s) are obtained by adjusting one or more parameters from the set of reference control parameter(s) and the at least one motion characteristic of the carrier is configured to change as the one or more parameters from the set of reference control parameter(s) is being adjusted. The vibration motion of the carrier changes as the one or more parameters from the set of reference control parameter(s) are being adjusted. In some cases, the set of control parameter(s) is selected from the plurality of different sets of control parameter(s) to reduce the vibration motion of the carrier when the carrier is supporting the type of payload from said plurality of different types. In other cases, the set of control parameter(s) is selected from the plurality of different sets of control parameter(s) to achieve a predefined level of actuation control and/or response speed when the carrier is supporting the type of payload from said plurality of different types.

In some embodiments, selecting the set of control parameter(s) from the plurality of different sets of control parameter(s) comprises comparing the at least one motion characteristic of the carrier to a plurality of different motion characteristic models of the carrier for the plurality of different types of payload. In some cases, the set of control parameter(s) is selected for a corresponding type of payload when the at least one motion characteristic of the carrier matches a motion characteristic model for the corresponding type of payload.

In some embodiments, the at least one motion characteristic of the carrier can be obtained when a signal is applied to the carrier when the carrier is supporting the type of payload from said plurality of different types. In some cases, the signal has a preassessed frequency and/or amplitude. In some cases, the carrier may comprise at least one motor, and the signal is augmented to an output torque of the at least one motor. The motion characteristic of the carrier comprises an angular acceleration of the carrier and the angular acceleration of the carrier is obtained using one or more inertial sensors located on the carrier. In this case, selecting the set of control parameter(s) from the plurality of different sets of control parameter(s) comprises comparing the angular acceleration of the carrier to a plurality of different angular acceleration responses of the carrier for the plurality of different types of payload. The set of control parameter(s) is selected for a corresponding type of payload when the angular acceleration of the carrier matches an angular acceleration response for the corresponding type of payload.

In some embodiments, the set of control parameter(s) utilized to control the carrier is suitable when the carrier is supporting a given type of payload from the plurality of different types of payload. In some embodiments, the carrier is a single-axis gimbal or a multi-axis gimbal and comprises at least one frame. The carrier comprises at least one motor for actuating the at least one frame relative to a movable object to which the carrier is coupled. The carrier may be rotatably coupled to the movable object and is configured to rotate relative to the movable object about one or more rotational axes.

In a separate yet related aspect, the present disclosure provides an apparatus for controlling a carrier configured to support a plurality of different types of payload, the apparatus comprising one or more processors that are individually or collectively configured to: obtain at least one motion characteristic of the carrier when the carrier is supporting a type of payload from said plurality, wherein said motion characteristic is indicative of the type of payload being supported by the carrier; and select a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

In another related aspect, the present disclosure provides a system for controlling a carrier configured to support a plurality of different types of payload, the system comprising: a movable object; the carrier being configured to operably couple a type of payload from said plurality of different types to the movable object; and one or more processors that are, individually or collectively, configured to: obtain at least one motion characteristic of the carrier when the carrier is supporting the type of payload from said plurality, wherein said motion characteristic is indicative of the type of payload being supported by the carrier; and select a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

In some embodiments, the carrier controlled by the system is a single-axis gimbal or a multi-axis gimbal and may comprise at least one frame. The carrier may comprise at least one motor for actuating the at least one frame relative to a movable object to which the carrier is coupled. The carrier may be rotatably coupled to the movable object and is configured to rotate relative to the movable object about one or more rotational axes. In some embodiments, movable object can be selected from a group consisting of an unmanned aerial vehicle (UAV) or a handheld support.

In a separate yet another related aspect, the present disclosure provides a non-transitory computer-readable medium storing instructions that, when executed, causes a computer to perform a method for controlling a carrier configured to support a plurality of different types of payload, the method comprising: obtaining at least one motion characteristic of the carrier when the carrier is supporting a type of payload from said plurality, wherein said motion characteristic is indicative of the type of payload being supported by the carrier; and selecting a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

In a another aspect, the present disclosure provides method for detecting a payload on a carrier configured to support the payload, the method comprising: obtaining at least one motion characteristic of the carrier, wherein said motion characteristic is indicative of a coupling state between the carrier and the payload; and assessing the coupling state between the carrier and the payload based on the at least one motion characteristic, wherein assessing the coupling state comprises assessing (1) whether the payload is coupled to the carrier, and/or (2) whether the payload is correctly mounted.

In some embodiments, the coupling state between the carrier and the payload is automatically assessed with aid of one or more processors without any user input. The coupling state between the carrier and the payload is automatically assessed with aid of one or more processors when the carrier is supporting the payload. In some cases, assessing whether the payload is coupled to the carrier comprises comparing the at least one motion characteristic of the carrier to a predefined motion characteristic of the carrier, wherein the predefined motion characteristic of the carrier is associated with a state of the carrier without the payload. Furthermore, assessing the coupling state may comprise assessing that the payload is not coupled to the carrier when the at least one motion characteristic of the carrier matches the predefined motion characteristic of the carrier. Alternatively, assessing that the payload is coupled to the carrier when the at least one motion characteristic of the carrier does not match the predefined motion characteristic of the carrier.

In some embodiments, the motion characteristics utilized in the method is obtained when a signal is applied to the carrier. In some cases, the signal has a preassessed frequency and/or amplitude. In some cases, the carrier may comprise at least one motor, and the signal is augmented to an output torque of the at least one motor. The motion characteristic of the carrier comprises an angular acceleration of the carrier and the angular acceleration of the carrier is obtained using one or more inertial sensors located on the carrier. In this case, assessing whether the payload is coupled to the carrier comprises comparing the angular acceleration of the carrier to a predefined angular acceleration response of the carrier, wherein the predefined angular acceleration response of the carrier is associated with a state of the carrier without the payload. Furthermore, the payload may be assessed not be coupled to the carrier when the angular acceleration response of the carrier matches the predefined angular acceleration response of the carrier. Alternatively, the payload is coupled to the carrier when the angular acceleration response of the carrier does not match the predefined angular acceleration response of the carrier.

In some embodiments, assessing the mounting position of the payload comprises comparing the at least one motion characteristic of the carrier to a plurality of different motion characteristic models of the carrier. The plurality of different motion characteristic models are indicative of the payload being coupled to the carrier in a plurality of different mounting positions. In some cases, assessing the mounting position of the payload may further comprising selecting the mounting position from the plurality of different mounting positions when the at least one motion characteristic of the carrier matches a motion characteristic model for the selected mounting position. The at least one motion characteristic of the carrier comprises an angular acceleration of the carrier, and wherein the plurality of different motion characteristic models comprise a plurality of different predefined angular acceleration responses of the carrier for the plurality of different mounting positions.

In some embodiments, the method of detecting a payload may further comprising obtaining at least one physical characteristic of the payload, wherein the at least one physical characteristic is indicative of the coupling state between the carrier and the payload; and assessing the coupling state between the carrier and the payload based on the at least one physical characteristic. The at least one physical characteristic comprises a proximity of the payload relative to a reference point on the carrier, a mass of the payload, or a mass distribution of the payload. In some embodiments, the at least one physical characteristic is obtained using one or more position detection sensors located on the carrier. In some cases, the position detection sensor is configured to assess whether a payload is coupled to the carrier prior to one or more inertial sensors obtaining the at least one motion characteristics wherein the position detection sensor is configured to assess a mounting position of the payload after one or more inertial sensors have obtained the at least one motion characteristics of the carrier. The position detection sensor may be a proximity sensor configured to detect a distance between the payload and the carrier, is a mass sensor configured to detect a mass of the carrier with and/or without the payload being coupled to the carrier, or a photoelectric sensor and/or a touch sensing switch.

In some embodiments, the method may further comprise: generating a plurality of signals that are indicative of the coupling state. A first signal is generated when the payload is assessed to be coupled to the carrier, and a second signal is generated when the payload is assessed not to be coupled to the carrier. A third signal is generated when the payload is assessed to be coupled to the carrier in a predefined mounting position, and a fourth signal is generated when the payload is assessed not to be coupled to the carrier in the predefined mounting position. In some cases, the predefined mounting position corresponds to a suitable mounting position for the payload on the carrier. The carrier is configured to support a plurality of different types of payload, and wherein said plurality types have different predefined mounting positions.

In embodiments, the carrier utilized in the method is a single-axis gimbal or a multi-axis gimbal and comprises at least one frame. The carrier comprises at least one motor for actuating the at least one frame relative to a movable object to which the carrier is coupled. The carrier may be rotatably coupled to the movable object and is configured to rotate relative to the movable object about one or more rotational axes. The carrier may be configured to rotate relative to the movable object about one or more rotational axes.

In a separate yet related aspect, the present disclosure provides an apparatus for detecting a payload on a carrier configured to support the payload, the apparatus comprising one or more processors that are individually or collectively configured to: obtain at least one motion characteristic of the carrier, wherein said motion characteristic is indicative of a coupling state between the carrier and the payload; and assess the coupling state between the carrier and the payload based on the at least one motion characteristic, wherein assessing the coupling state comprises assessing (1) whether the payload is coupled to the carrier and/or (2) a mounting position of the payload if the payload is assessed to be coupled to the carrier.

In another separated yet related aspect, the present disclosure provides a system for detecting a payload on a carrier configured to support the payload, the system comprising: a movable object; the carrier being configured to operably couple the payload to the movable object; and one or more processors that are, individually or collectively, configured to: obtain at least one motion characteristic of the carrier, wherein said motion characteristic is indicative of a coupling state between the carrier and the payload; and assess the coupling state between the carrier and the payload based on the at least one motion characteristic, wherein assessing the coupling state comprises assessing (1) whether the payload is coupled to the carrier and/or (2) a mounting position of the payload if the payload is assessed to be coupled to the carrier.

In another related aspect, the present disclosure provides a non-transitory computer-readable medium storing instructions that, when executed, causes a computer to perform a method for detecting a payload on a carrier configured to support the payload, the method comprising: obtaining at least one motion characteristic of the carrier, wherein said motion characteristic is indicative of a coupling state between the carrier and the payload; and assessing the coupling state between the carrier and the payload based on the at least one motion characteristic, wherein assessing the coupling state comprises assessing (1) whether the payload is coupled to the carrier and/or (2) a mounting position of the payload if the payload is assessed to be coupled to the carrier.

In another aspect, the present disclosure provides method for detecting a payload on a carrier configured to support a plurality of different types of payload, the method comprising: obtaining at least one physical characteristic of the payload, wherein the at least one physical characteristic is indicative of a coupling state between the carrier and the payload; assessing the coupling state between the carrier and the payload based on the at least one physical characteristic; wherein assessing the coupling state comprises assessing (1) whether the payload is coupled to the carrier and/or (2) a mounting position of the payload if the payload is assessed to be coupled to the carrier; and selecting a set of control parameters for controlling the carrier if the carrier is assessed to be coupled to the payload.

In some embodiments, the method may further comprise selecting a set of control parameter(s) from a plurality of different sets of control parameter(s) based on said physical characteristic, wherein the selected set of control parameter(s) is suitable for controlling movement of the carrier for the type of payload being supported by the carrier, and wherein each individual set of control parameter(s) is suitable for controlling the carrier that supports a type of payload that is different from another payload in said plurality of payloads. In some embodiments, the plurality of different types of payload are different in at least one of the following aspects: (i) mass, (ii) center of gravity, (iii) size, (iv) shape, (v) payload function, or (vi) type of material of the payload. In some cases, the plurality of different types of payload comprise different types of imaging devices. In some embodiments, the at least one physical characteristic comprises a proximity of the payload relative to a reference point on the carrier, a mass or mass distribution of the payload. In some embodiments, the at least one physical characteristic may be obtained using one or more position detection sensors located on the carrier. In some embodiments, the position detection sensor is configured to assess whether a payload is coupled to the carrier prior to one or more inertial sensors obtaining the at least one motion characteristics wherein the position detection sensor is configured to assess a mounting position of the payload after one or more inertial sensors have obtained the at least one motion characteristics of the carrier. The position detection sensor may be a proximity sensor configured to detect a distance between the payload and the carrier, a mass sensor configured to detect a mass of the carrier with and/or without the payload being coupled to the carrier, or a photoelectric sensor and/or a touch sensing switch. In some embodiments, the carrier utilized in the method is a single-axis gimbal or a multi-axis gimbal and may comprise at least one frame. The carrier may comprise at least one motor for actuating the at least one frame relative to a movable object to which the carrier is coupled. The carrier may be rotatably coupled to the movable object and is configured to rotate relative to the movable object about one or more rotational axes. In some embodiments, movable object can be selected from a group consisting of an unmanned aerial vehicle (UAV) or a handheld support.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The present disclosure provides improved systems, methods, and devices for controlling a carrier configured to support a plurality of different types of payloads. In some embodiments, a payload may be coupled to a movable object (e.g., such as a UAV, human, vehicle) using a carrier that controls the position and/or orientation (attitude) of the payload. The payloads may have a wide range of physical properties, such as weight, shape, size, moment of inertia, etc. that may affect the dynamic performance of a control system. Advantageously, the embodiments herein can account for the various characteristics of the payloads as well as the carrier when determining the optimal control parameters, thus enhancing the robustness of the system for different types of payloads and thereby improving the performance of the control system.

In one aspect, the present disclosure provides a method for controlling a carrier configured to support a plurality of different types of payload.

In some embodiments, a carrier may be configured to support a plurality of different types of payload. As described herein, the carrier can be provided for the payload and the payload can be coupled to a movable object via the carrier, either directly (e.g., directly contacting the movable object) or indirectly (e.g., not contacting the movable object).

Figure 12:
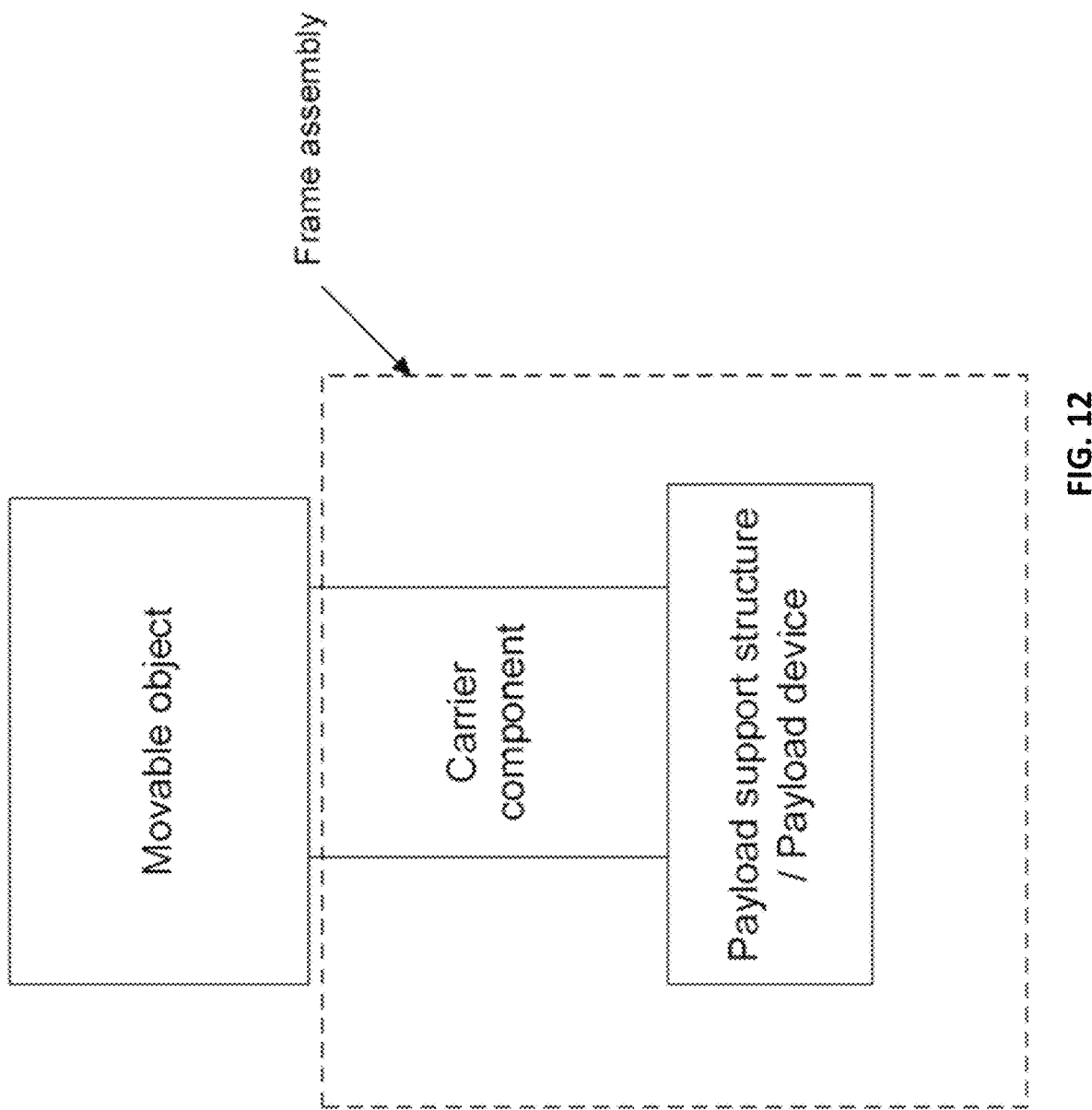
FIG. 12 is a block diagram of a frame assembly comprising a carrier component for connecting a payload support structure/payload to a movable object, in accordance with some embodiments.

Referring to FIG. 12, the carrier may comprise a frame assembly, a motor assembly, and a controller assembly.

The frame assembly may comprise a carrier component and a payload support structure coupled to each other. The carrier component may be any frame member, connecting member, mounting arm, connecting arm, torsion arm, elongated arm, support frame, etc. that can be used to connect the payload support structure to a movable object. In some embodiments, the movable object may be an aerial vehicle such as an unmanned aerial vehicle (UAV). The carrier component may be configured to connect the payload support structure and/or the payload to the movable object, for example as shown in FIG. 12. In some embodiments, controlling the carrier may comprise effecting movement of the carrier based in part on the selected set of control parameters. In some embodiments, the movement of the carrier may comprise an angular position, an angular velocity, an/or an angular acceleration of the carrier with respect to one or more axes.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can be a suitable mounting structure (e.g., a gimbal platform) capable of stabilizing and/or directing the movement of the payload. In some embodiments, the carrier can be adapted to control the state of the payload (e.g., position and/or orientation) relative to the movable object. The carrier can be rotatably coupled to the movable object (e.g., via a rotatable joint or connection) so as to rotate relative to the movable object about one or more rotational axes. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, controlling the carrier may comprise effecting movement of the carrier based in part on the selected set of control parameters. In some embodiments, the movement of the carrier may comprise an angular position, an angular velocity, an/or an angular acceleration of the carrier.

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof. In some embodiments, some or all of the axes of movement are orthogonal axes, e.g., a roll, pitch, and yaw axis. For example, the carrier can be configured to permit movement of the payload about a roll, pitch, and/or yaw axis. In some embodiments, the carrier is a single-axis or multi-axis gimbal that permits movement of the payload about a roll, pitch, and/or yaw axis. In alternative embodiments, some or all of the axes of movement may be non-orthogonal axes.

In some embodiments, the carrier includes one or more frames that provide support to the payload, such as one, two, three, or more frames. For instance, the carrier can include a single frame that is coupled (e.g., rotatably coupled) to the movable object and the payload. The carrier can include a first frame that is coupled (e.g., rotatably coupled) to the payload and a second frame that is coupled (e.g., rotatably coupled) to the movable object, and the first and second frames can be coupled (e.g., rotatably coupled) to each other, such that the payload is serially coupled to the movable object by the first frame and second frame. The carrier can include a first frame that is coupled (e.g., rotatably coupled) to the payload, a second frame that is coupled (e.g., rotatably coupled) to the movable object, and a third frame coupling (e.g., rotatably coupling) the first and second frames, such that the payload is serially coupled to the movable object by the first, third, and second frames. In some embodiments, a frame coupled to the movable object may be referred to as an "outer" or "outermost" frame, a frame coupled to the payload may be referred to as an "inner" or "innermost" frame, and a frame that is not directly coupled to the movable object or the payload may be referred to as a "middle frame."

Some or all of the frames can be movable relative to one another, and the carrier can include one or more actuators (e.g., motors) that actuate movement of the individual carrier frames. For instance, an actuator can actuate rotation of a carrier frame by applying a torque to the carrier frame about an axis of rotation. The actuators can permit the movement of multiple frames simultaneously, or may be configured to permit the movement of a single frame at a time. The movement of the frames can produce a corresponding movement of the payload. For example, the actuators can actuate a rotation of one or more frames about one or more axes of rotation (e.g., roll axis, pitch axis, or yaw axis). The rotation of the one or more frames can cause a payload to rotate about one or more axes of rotation relative to the movable object. Alternatively or in combination, the carrier actuation assembly can actuate a translation of frames along one or more axes of translation, and thereby produce a translation of the payload along one or more corresponding axes relative to the movable object. In some embodiments, the carrier includes one or more of: a yaw frame and a yaw actuator coupled to the yaw frame so as to actuate rotation of the yaw frame about a yaw axis; a roll frame and a roll actuator configured to actuate rotation of the roll frame about a roll axis; and/or a pitch frame and a pitch actuator configured to actuate rotation of the pitch frame about a pitch axis. In some embodiments, the carrier is coupled to the movable object via the yaw frame, while in other embodiments, the carrier can be coupled to the movable object via the pitch or roll frame.

As described herein, a plurality of different types of payload can be supported and controlled/stabilized by the carrier. The payload may be coupled to a movable object such as a motorized or non-motorized vehicle or vessel, robot, human, animal, or the like using a carrier that controls the position and attitude of the payload. For example, an instruction regarding a desired movement of the payload can be received (e.g., from a user and/or from a processor onboard the movable object) and a corresponding movement of the carrier to achieve the desired movement of the payload can be determined. In other instances, the payload can be stabilized using a carrier controlled by an active mechanical control system.

In some embodiments, the payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Figure 1:
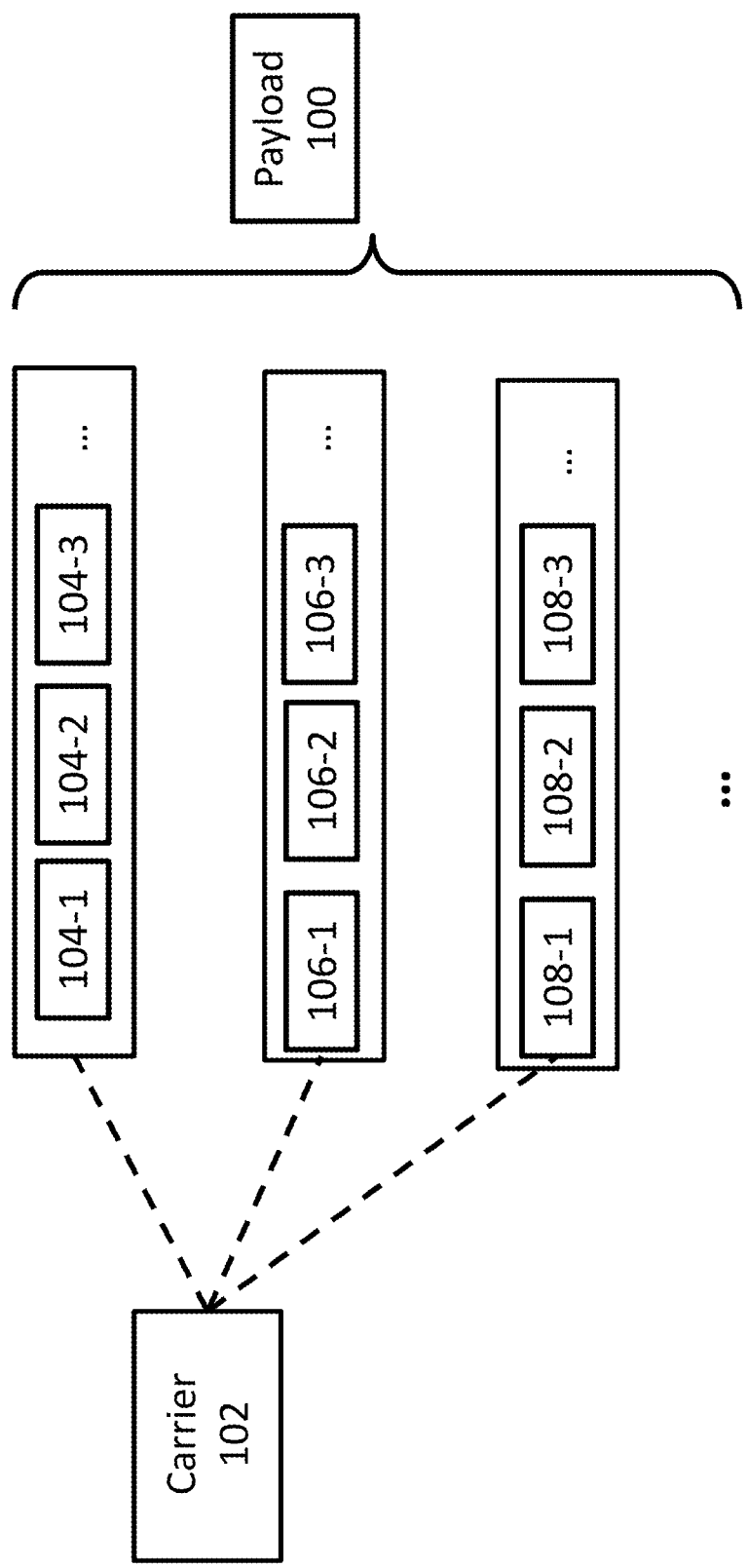
FIG. 1 illustrates a plurality of different types of payloads that can be supported by a carrier, in accordance with some embodiments.

From a control perspective, physical characteristics and/or dynamics of the payload may affect the performance of the control of the carrier. In some embodiments, a plurality of different types of payloads that are supported by the carrier are different in at least one of the fowling (i) mass, (ii) center of gravity, (iii) size, (iv) shape, (v) payload function, or (vi) type of material of the payload. As illustrated in FIG. 1, the plurality of different types of payloads 100 can be supported by a carrier 102. In some embodiments, the plurality of types of payloads may have different physical characteristics, such as different mass, center of mass/gravity, size, shape and material, etc. For example, payload 104-1, 104-2 and 104-3 may have different range in terms of the location of center of mass, whereas payload 106-1, 106-2, 106-3 may have different range in terms of size or dimension. In another example, a payload of type 108-1 may refer to a payload with mass within the range from 0 kg to 0.5 kg and another type of payload 108-2 may refer to a payload with mass within the range from 0.5 kg to 2 kg.

In other embodiments, different types of payload may refer to the various ranges of moment of inertia of the payloads. In some cases, the range difference in terms of the physical characteristics may lead to a large disparity in the dynamic performance of the payload that no constant control parameters can be used to achieve a good control performance.

In some embodiments, the plurality of different types of payload may comprise different types of imaging devices. In some instances, the different types of imaging devices may have different masses, sizes, and/or shapes. In some cases, the support structure of the carrier may be configured to adapt to the different sizes of the imaging devices. In other instances, the different types of imaging devices may be configured to be operably coupled to the carrier in different configurations such that changes in the configuration may result in changing in the physical characteristics of the imaging devices. For example, when an imaging device is tilting or zooming, the center of mass may be changed thus leading to an increase or decrease in the moment of inertia of the imaging devices.

As described previously, the carrier may be configured to stabilize or control a rotational movement of the payload with respect to a plurality of degrees of freedom (e.g., about one, two, or three axes). A torque may be applied to the carrier to cause the rotational movement. One or more motion characteristics of the carrier such as the angular acceleration α of the carrier and the physical characteristics of the carrier (with payload) such as the moment of inertia J may have a relationship according to the equation below:

$$T=J\alpha$$

Figure 2:
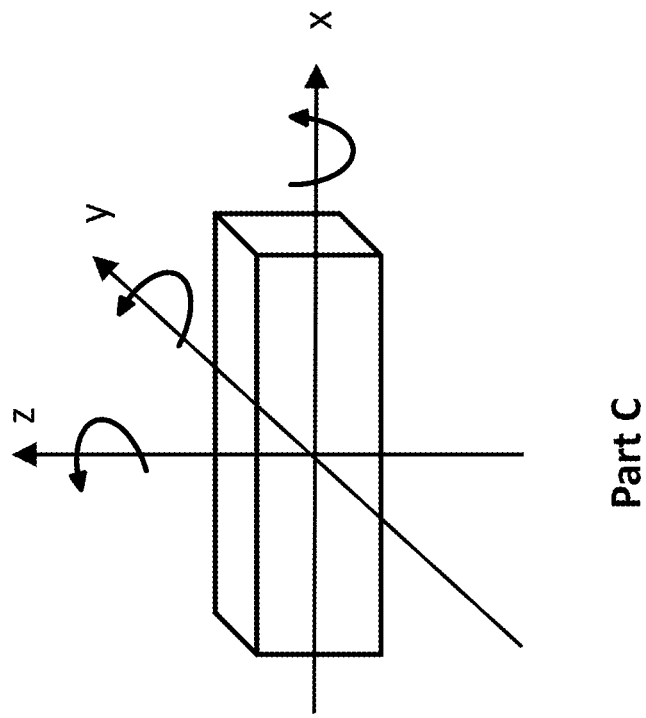
FIG. 2 shows examples of various physical characteristics that may be considered for determining the control parameters.
Figure 2:
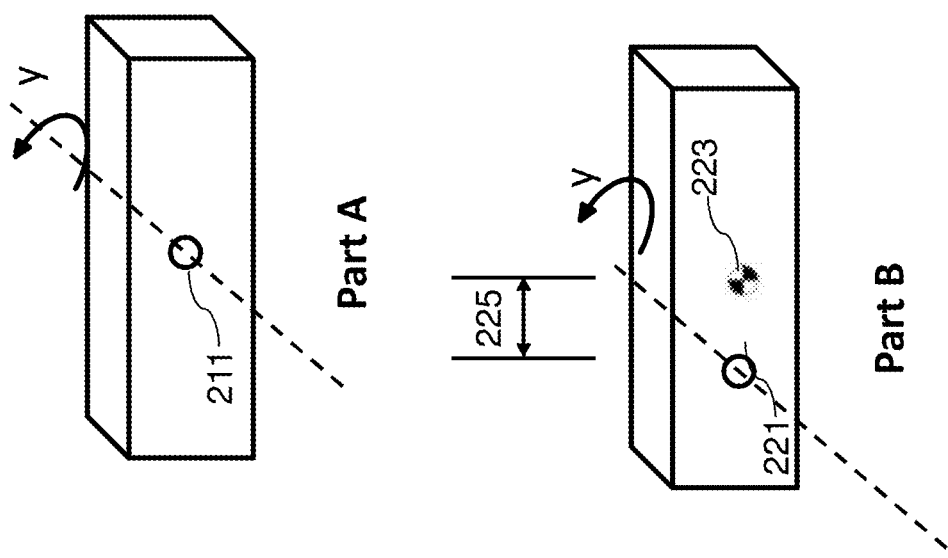

FIG. 2 shows examples of various physical characteristics that may be considered for determining the moment of inertia J. For example, as shown in part A, when the center of gravity coincide with the dynamic center, the moment of inertia of the object is determined by the mass distribution of the object. In this case, the shape, size, material and density of the object could affect the mass distribution of the payload thus the moment of inertia of the payload. In practicing, this case may correspond to the situation where the payload has an asymmetric shape or mass distribution, or the payload changes its attitude. In some instances, the same payload may have different moments of inertia due to different locations of dynamic center/rotation axis. For the example in part B, the off-center distance 225 between the dynamic center 221 and the mass center 223 causes an increase in the moment of inertia compared to 210. In practicing, this case may correspond to the situation where the payload is not mounted properly such that the mass center of the payload is greatly deviated from the rotation axis. In some instances, the moment of inertia about different axis is different. As shown in part C, the moment of inertia of the object can be calculated with respect to different axis x, y and z according to methods known to those of skill in the art.

Figure 3:
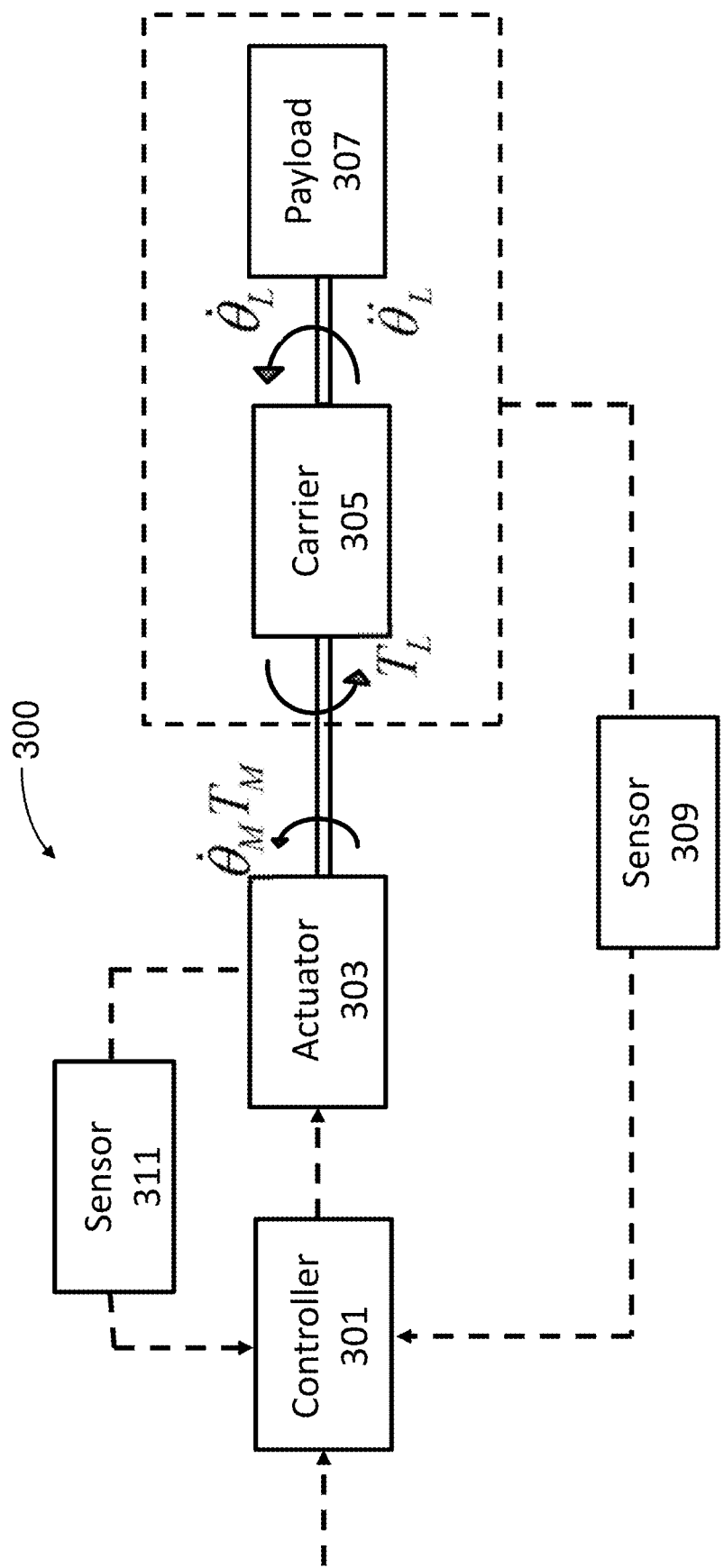
FIG. 3 illustrates an example of a system for controlling or stabilizing rotational movement of a payload about a plurality of axes, in accordance with some embodiments.

FIG. 3 illustrates an example of a system 300 for controlling or stabilizing a rotational movement of a payload with respect to one or more axes, in accordance with some embodiments. The system 300 can include a controller 301, one or more actuator 303, a carrier 305, one or more sensors 309 and 311, and a payload 307. In some embodiments, the carrier 305 may be a three-axis gimbal platform. Alternatively, the carrier can be one or two-axis gimbal platform.

In some embodiments, controlling the carrier may comprise effecting movement of the carrier based in part on the selected set of control parameters. In some embodiments, the movement of the carrier may comprise an angular position, an angular velocity, an/or an angular acceleration of the carrier.

In some embodiments, the movement of the carrier is effected relative to a movable object to which the carrier is operably coupled as described elsewhere herein.

As described above and herein, the carrier 305 can be used to control the spatial disposition of a coupled payload. For instance, the carrier can be used to rotate the payload to a desired spatial disposition. The desired spatial disposition can be manually input by a user (e.g., via remote terminal or other external device in communication with the movable object, carrier, and/or payload), determined autonomously without requiring user input (e.g., by one or more processors of the movable object, carrier, and/or payload), or determined semi-autonomously with aid of one or more processors of the movable object, carrier, and/or payload. The desired spatial disposition can be used to calculate a movement of the carrier or one or more components thereof (e.g., one or more frames) that would achieve the desired spatial disposition of the payload.

For example, in some embodiments, an input angle (e.g., a yaw angle) associated with a desired attitude of the payload is received by one or more processors (e.g., of the movable object, carrier, and/or payload). Based on the input angle, the one or more processors can determine an output torque to be applied to the carrier or one or more components thereof (e.g., a yaw frame) in order to achieve the desired attitude. The output torque can be determined in a variety of ways, such as using a controller 301. In some embodiments, a feedback control loop may be used to control the movement of the carrier. The feedback control loop can take the input angle as an input and output the output torque as an output. The feedback control loop can be implemented using one or more of a proportional (P) controller, a proportional-derivative (PD) controller, a proportional-integral (PI) controller, a proportional-integral-derivative (PID) controller, or combinations thereof.

In some embodiments, the actuator(s) 303 may be one or more motors. The motor may or may not be a DC servo motor. In some embodiments, a speed control of the motor may be carried out by changing the supply voltage of the motor. In some embodiments, when a torque disturbance is neglected, the dynamic of the system can be represented by the following equation:

$$T_M = K_M i_a(t) \quad (1)$$

$$T_M = J_M \ddot{\theta}_M + J_L \ddot{\theta}_L + a_M \dot{\theta}_M + a_L \dot{\theta}_L \quad (2)$$

Where $T_M$ represents the torque generated by the motor, $K_M$ represents the motor mechanical constant, $i_a(t)$ represents the motor armature current, $J_M$ represents the motor's moment of inertia, $J_L$ represents the platform's moment of inertia (including carrier and payload), $a_M$ is the damping ratio of the motor and $a_L$ is the damping ratio of the platform. In some embodiments, for simplicity, the viscous friction of the system is ignored so that $a_M$ and $a_L$ are zero. Therefore from equation (1) and (2) the moment of inertia of the platform is derived by the following equation:

$$J_L = \frac{K_M i_a(t) - J_M \ddot{\theta}_M}{\ddot{\theta}_L} \quad (3)$$

In some embodiments, the motor mechanical constant $K_M$ can be obtained from the motor specification. The motor armature current $i_a(t)$ can be measured by any suitable device such as a voltmeter or ammeter. In some embodiments, the current can be obtained from the controller or the motor driver via an amplifier. In some embodiments, $J_L$ may refer to the moment of inertial of the platform that is actuated by the motor such that $J_L$ may include the carrier and the payload. In some embodiments, the moment of inertia of the motor $J_M$ can be calculated or obtained prior to operating the control system. In some cases, the moment of inertia of the motor can be obtained from the specification of the motor.

From equation (3), it is known that the moment of inertia of the platform can be derived from one or more motion characteristics. As shown in the equation, the motion characteristics may include the angular acceleration of the carrier and angular acceleration of the motor. In some embodiments, when the motor is a direct drive motor, the angular acceleration of the motor and carrier may be equivalent. In other embodiments, the motor may be equipped with a gear or other transfer elements may be included between the motor and the carrier such that the acceleration of the motor and the carrier may be different at the same time point.

In some embodiments, the motion characteristics of the platform may be obtained using one or more sensors 309 located on the carrier. In some embodiments, the one or more sensors can collectively constitute an inertial measurement unit (IMU). In other embodiments, the one or more sensor may include at least a gyroscope used for measuring an angular velocity of the carrier. However, any type of sensors may be used dependent on the variables to be controlled in the system.

The sensor(s) 309 can be any sensor suitable for obtaining data indicative of a spatial disposition (e.g., position, orientation, angle) and/or motion characteristic (e.g., translational (linear) velocity, angular velocity, translational (linear) acceleration, angular acceleration) of a payload, such as an inertial sensor. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion.

The sensor(s) 309 can be carried by the carrier. The carrier sensor can be situated on any suitable portion of the carrier, such as above, underneath, on the side(s) of, or within a body of the carrier. The sensor(s) can be located on the frame or a support portion of the carrier. Some sensors can be mechanically coupled to the carrier such that the spatial disposition and/or motion of the carrier correspond to the spatial disposition and/or motion of the sensors. The sensor can be coupled to the carrier via a rigid coupling, such that the sensor does not move relative to the portion of the carrier to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the payload. Furthermore, the sensor can be electrically coupled with a portion of the payload (e.g., processing unit, control system, data storage).

In some embodiments, the direct data from the sensor(s) 309 need not be the angular acceleration. Further processing operations may be applied to the data to obtain the angular acceleration. For example, when the raw data is the angular velocity, a first order differentiation may be carried to get the acceleration. In another example, the data may be filtered before being used to calculate the moment of inertia of the carrier.

In some embodiments, the motion characteristics of the motor may be obtained using one or more sensor(s) 311 located on the motor. For example, the sensor(s) 311 may be located on an output shaft of the motor and configured to measure the angular acceleration of the motor such as an encoder or angular potentiometer.

In some embodiments, controlling the carrier may comprise effecting movement of the carrier based in part on the selected set of control parameters. In some embodiments, the movement of the carrier may comprise an angular position, an angular velocity, and/or angular acceleration of the carrier.

Regarding the control system, cascaded proportional-integral-derivative (PID) may be used to control the attitude and velocity of the carrier. In some instances, angular acceleration may also be controlled. In other instances, output torque may be a variable to be controlled. One or more feedback loops may be used for controlling an attitude and/or angular velocity of the carrier system. It is known that the dynamics of a system are affected by the mechanical model of the system, controller and input/disturbance signals. In some embodiments, the gimbal or carrier system can be regarded as a MISO (multi-input-single-output) plant with two inputs (voltage applied at the motor's armature and the external disturbance torque), and one output (carrier's angular velocity). For simplicity, the gimbal or carrier system can be modeled as a SISO (single-input-single-output) system neglecting the external disturbance torque. In this case, an exemplary equation representing the transfer function including a DC motor is:

$$G_m(s) = \frac{\dot{\theta}_m(s)}{u_a(s)} = \frac{K_M}{J_m^* L_a s^2 + (L_a a_m^* + J_m^* R_a)s + a_m^* R_a + K_M K_e} \quad (4)$$

where $L_a$ is the inductance of the motor armature, $R_a$ is the resistance of the motor armature, $K_e$ is the motor electrical constant. In some embodiments, these parameters and variables of DC motor can be obtained from the specification of the DC motor. $u_a$ is the motor's armature voltage that can be measured by any suitable device. $J_m^* = J_L + J_M$ represents the total moment of inertia seen from the motor side, whereas $a_m^* = a_L + a_M$ is the total viscous friction constant seen from the motor side. Equation (4) represents a second order plant. In some embodiments, the plant can be modeled as a first order system when the inductance is small that can be neglected. However either representation shows that the moment of inertia of the platform affect the dynamic response of the system. For example, when the command signal is a step signal, the moment of inertia of the payload or carrier may affect dynamic specifications such as the settling time, rising time and stability (e.g., overshoot, oscillation) of the system. In another example, when the command signal is a sinusoidal signal, the moment of inertia of the payload may have effect on the system behavior in terms of phase shift (time delay), resonance frequency, peak, amplitude, etc. of the output.

It should be noted that there are a variety of control algorithms can be used to control a gimbal or carrier system, including but not limited to: ON-OFF, PID modes, feedforward, adaptive, intelligent (Fuzzy logic, Neural network, Expert Systems and Genetic) control algorithms. For a specific control model such as PID control, based on various control objective/output variable (e.g., angular velocity, angular position, angular acceleration, torque, etc.) to be controlled and the input variable (e.g. input voltage) the control system can be different. Accordingly, control parameters may be represented in various ways. However, the presented method and system provides a controller adapt to various payloads automatically independent of how the system is represented mechanically and/or mathematically.

In one aspect, the present disclosure provides a method for controlling a carrier configured to support a plurality of different types of payload. In practicing, the method may comprise: obtaining at least one motion characteristic of the carrier when the carrier is supporting a type of payload from said plurality, wherein said motion characteristic is indicative of the type of payload being supported by the carrier; and selecting a set of control parameter(s) from a plurality of different sets of control parameter(s) based on said motion characteristic, wherein the selected set of control parameter(s) is suitable for controlling movement of the carrier for the type of payload being supported by the carrier, and wherein each individual set of control parameter(s) is suitable for controlling the carrier that supports a type of payload that is different from another payload in said plurality of payloads.

In some embodiments, a set of control parameter(s) may be automatically selected with aid of one or more processors without user input. In some embodiments, the set of control parameter(s) may be selected when the carrier supporting the type of payload from a plurality of different types is in motion.

In order to achieve a fast and accurate control of the attitude and angular velocity of the gimbal or carrier system, the parameters of the controller needs to be adjusted to accommodate different types of payloads. There are a number of methods for tuning the parameters of the control system, such as offline tuning and online turning. However, most of the turning methods are aggressive trial-and-error type that may cause damage of system or time consuming. In some embodiments, the presented method and system provides a method for controlling a gimbal or carrier platform configured to support a plurality of different types of payload by automatically adjusting the parameters of the controller according to one or more motion characteristics of the carrier.

In some embodiments, the present disclosure allows that a set of control parameters are selected from a plurality of different sets of control parameters with aid of one or more processors when the carrier supporting the type of payload from the plurality of different types is in motion.

Figure 4:
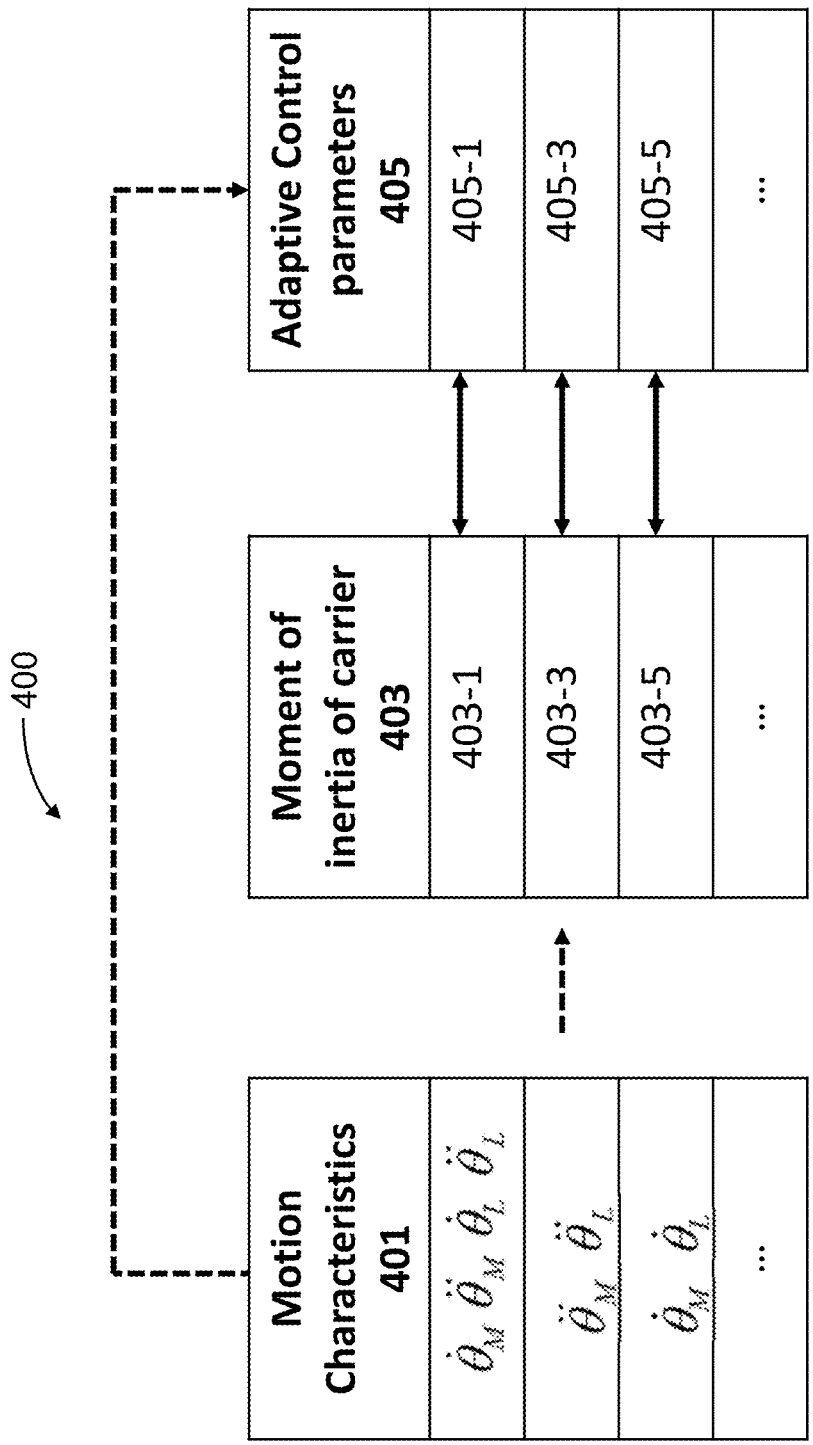
FIG. 4 illustrates an exemplary relationship between a plurality of motion characteristics, moment of inertia and control parameters.

FIG. 4 illustrates an exemplary relationship between a plurality of motion characteristics, moment of inertia and sets of control parameters. As described previously, different types of payloads may correspond to different physical characteristics (mass distribution, mass center, shape, size, etc.). The different physical characteristics may result in different moment of inertia of the carrier. In some embodiments, the different types of payloads may refer to payloads with moment of inertia in different ranges. In some embodiments, the different moment of inertia may be considered by a gimbal or carrier controller for controlling the carrier. In some instances, the data of the moment of inertia 403 and control parameters 405 may be stored as a lookup table 400, where the optimal control parameters for the different types of payloads can be accessed based on the corresponding moment of inertia. For example, when a moment of inertia of a carrier about a rotation axis is calculated using the method described previously, the control parameter of the controller for controlling the movement about the related rotation axis can be provided from the lookup table. As shown in FIG. 4, one or more moment of inertia may be correlated with a set of control parameters. For, example, 403-1 may be the moment of inertia of the carrier about a roll axis and it corresponds to a set of control parameters that can be used to control the rotational movement (e.g., angular velocity and attitude) of the carrier about the roll axis. Alternatively, one entry of the moment of inertia may refer to a range of moment of inertia. For example, 403-3 may represent moment of inertia within the range 0.01 kg·m$^2$-0.1 kg·m$^2$ and 403-5 may represent 0.1 kg·m$^2$-0.5 kg·m$^2$. The control parameters may be determined based on a specific control model. For example, the control parameters may refer to a set of PID (proportional gain, integral gain, and derivative gain), PD or PI parameter in a closed loop feedback controller. In some instances, the lookup table may be stored in a non-transitory computer-readable medium that can be accessed by the controller of the carrier. In other instances, the lookup table may be stored on an external device that can be remotely accessed by the controller.

Optionally, the lookup table may further contain time invariant constants (e.g. motor parameters back EMF, armature inductance, moment of inertia of motor shaft, coefficient of viscous friction, etc.) that can be obtained from specifications of the actuators. In some embodiments, the actuator may be a motor and the constants may comprise the moment of inertia of the motor and mechanical constant of the motor. Alternatively, these motor specific constants may not be stored in the lookup table.

The lookup table 400 may be created based on empirical test data such as an offline testing of a specific gimbal system. For example, a payload may be mounted to a gimbal or carrier platform then a testing excitation signal may be supplied to the actuator to rotate the carrier with respect to one or more axes. During the testing process, control parameters of the controller may be tuned to achieve an optimal dynamic performance (e.g. timely accurate response) using methods (e.g., Ziegler-Nichols based on analysis of features from dynamic experiment data or frequency response) that are known to those skilled in the art. Alternatively, the look up table can be created based on simulated or projected data. In some instances, data stored in the look up table may be entered by an individual.

In some embodiments, the lookup table 400 may further contain one or more motion characteristics 401 of the gimbal or carrier platform. In some instances, one entry of the motion characteristics may include angular velocity and angular acceleration of one or more motors and the carrier. In other instances, one entry of the motion characteristics may include the angular acceleration of the motor and the carrier. Alternatively, one entry of the motion characteristics may include the angular velocity of the motor and the carrier. In some embodiments, entries of the motion characteristics and entries of the moment of inertia are in one-to-one correspondence under a specific set of motor constants and the input signal. In some embodiments, different entries of the motion characteristics 401 may refer to different ranges of the variables. For example, an entry of the motor characteristics may contain angular acceleration of motor as 10-30 $rad/sec^2$ and angular velocity as 10-20 rad/sec.

In some embodiments, the control parameters 405 stored in the lookup table may be a plurality of PID gains. However, an entry of the control parameters can contain various elements based on the specific control model. For example, when two close loops are used for controlling the angular position and angular velocity respectively, two sets of PID gains may be stored in each entry. In some embodiments, when the control model is pre-determined, different entry (e.g., 405-1 and 405-3) may contain the same number of control parameters with different value.

In some embodiments, the selected set of control parameters 405 may be suitable for effecting the movement of the carrier to achieve a predefined level of actuation control when the carrier is supporting the type of payload from a plurality of different types of payload. A variety of methods can be used to determine the suitable control parameters. For example, the control parameters can be determined by running experiment test of the system and analyze the performance specification (e.g., frequency analysis, time response, etc.). Alternatively, any suitable simulation, modeling, analytic analysis can be used to determine the optimal control parameters. In some instances, setting a controller using the optimal control parameters may ensure meeting and maintaining the following performance specification: settling time, steady state error less than certain value. However it should be noted that the performance specification may be varied based on specific control objective (e.g. angular position or velocity).

In some embodiments, the suitable control parameters for controlling movement of the carrier can be selected using the lookup table. In some embodiments, the current moment of inertia of the carrier about each rotation axis can be determined using the method described previously herein (e.g., equation (3)). By comparing of the current moment of inertia with the data stored in the lookup table, the optimal control parameters can be selected from the lookup table. In some embodiments, the current moment of inertia of the carrier is calculated by obtaining at least one motion characteristics of the carrier when the carrier is supporting a type of payload. In some instances, the motion characteristics may include angular acceleration of both the motor and the carrier, then the moment of inertia of the carrier can be calculated using the method described herein. Alternatively, the obtained angular acceleration of the motor and carrier can be compared with the stored data directly for choosing the control parameters when the lookup table is augmented with the input signal and motor specifications.

In some embodiments, the motion characteristic of the carrier is obtained using one or more inertial sensors located on the carrier as described elsewhere herein. In some embodiments, the motion characteristics may be sampled at different time points and an average value of the moment of inertia is used for an improved accuracy. In this case, two, three, four, five sampling data may be obtained at different time points. In some embodiments, a plurality of motion characteristics can be obtained within a relatively short time such that an moment of inertia of the carrier may be calculated within a short period of time and accordingly the control parameters may be determined within seconds.

In some embodiments, one or more processors may be configured to calculate the moment of inertia of the carrier and select the optimal control parameters from a lookup table. In some embodiments, the one or more processors can be programmable, such as PC, microcomputer, microcontroller, DSP, ASICs and PLC, etc. The one or more processors can be located on the carrier platform or operatively coupled to the carrier platform.

Figure 5:
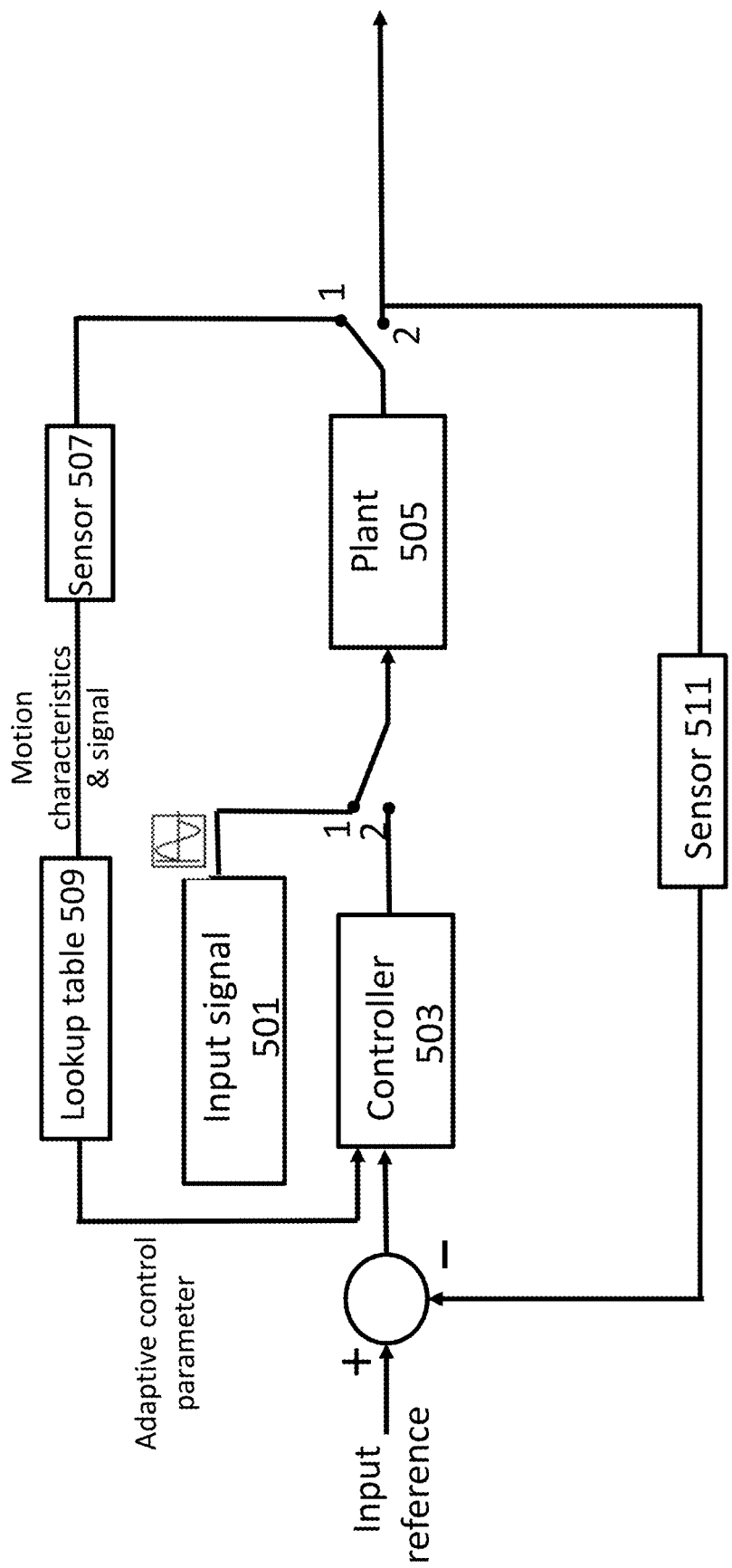
FIG. 5 shows an example of an adaptive control scheme that may be implemented in a carrier, in accordance with an embodiment of the disclosure

FIG. 5 shows an example of an adaptive control scheme that may be implemented in a carrier or gimbal platform, in accordance with an embodiment of the disclosure. The adaptive control scheme may be used to control or stabilize the attitude and/or velocity the carrier. For example, the control scheme may be used to control the rotational movement of the carrier about the pitch axis, roll axis, and yaw axis. In some embodiments, the carrier may be configured to support one or more payloads with variable types.

As shown in FIG. 5, process 1 may refer to the process of determining the adaptive control parameters. In some embodiments, selecting a set of suitable control parameters for a type of payload may be based on one or more motion characteristics of the payload. In some embodiments, the one or more motion characteristics may be the angular acceleration, angular velocity, and or angular displacement of the carrier. In some embodiments, the motion characteristics are obtained in response to an input signal. An input signal 501 may be supplied to one or more actuators of the carrier or gimbal system 505. In some embodiments, the input signal may be a low power signal such that the plant 505 (e.g. carrier and actuator) may not be under the risk of violent oscillation. The input signal may be generated by any suitable device such as a programmable logic controller. In some embodiments, one or more processors may be configured to generate the input signal. The one or more processors may be implemented in any or a combination of the following technologies, which are all well known in the art: discrete electronic components, discrete logic circuits having logic gates for implementing logic functions upon data signals, an application specific integrated circuit having appropriate logic gates, a programmable gate array(s), a field programmable gate array (FPGA), etc. The input signal can be digital or analog. In some embodiments, the input signal can be sinusoidal voltage or current signal and supplied to the driver of the actuators. Device such as voltage amplifier or current amplifier, AC-to-DC converter and the like may be used to adjust the signal to the require form based on the specific type of motors.

The input signal 501 supplied to the one or more motors of the plant 505 may actuate the carrier to move at certain velocity and acceleration. As described previously, the current signal (e.g. $i_a$ or $u_a$) supplied to the motors may be measured by any suitable device. In some embodiments, the motor may be a DC motor so that the speed of the motor may be controlled by the current provided to the motor as described previously in the DC motor model.

In some embodiments, one or more sensors 507 may be used to measure the motion characteristics of the carrier and the one or more motors. In some embodiments, the one or more sensors may be the same sensors 511 that are used to provide feedback signals in a closed control loop. For example, in a gimbal or carrier platform, the sensors can be IMU or gyroscope attached to the carrier and encoders or tachometer attached to the motors. In some embodiments, the motion characteristics may include angular velocity and/or angular acceleration of the carrier about a roll axis, pitch axis and yaw axis. Once the motion characteristics are obtained, moment of inertia of the carrier can be calculated using equation (3). In some embodiments, the motion characteristics may be sampled at different time points and an average value of the moment of inertia may be calculated for an improved accuracy. In this case, two, three, four, five sampling data may be obtained at different time points. In some embodiments, a plurality of motion characteristics may be obtained within a relatively short time such that a moment of inertia of the carrier may be calculated in a timely manner, accordingly the control parameters may be determined within seconds.

The calculated moment of inertia may be compared with the moment of inertia stored in a lookup table 509 (correspond to the lookup table 400 in FIG. 4) to determine the optimal control parameters of the system. The lookup table may be generated using the method as previously described herein. The selected control parameters may be used to control the carrier or gimbal with optimal dynamic performance. Process 1 can occur when the carrier or gimbal is coupled to a payload of unknown types. For example, process 1 may operate when a new payload is mounted to a gimbal or carrier platform. In another example, process 1 may operate when one or more mechanical characteristics of the payload change such as center of mass of a camera device caused by the change of attitude, lens zooming or any configuration. In some embodiments, process 1 may operate when the gimbal or carrier is at a home position. In other embodiments, process 1 may operate when the gimbal or carrier is at a random position during initialization of the gimbal system.

The adaptive control parameters determined from process 1 may be used to control the carrier or gimbal in process 2. Settings of the controller 503 may be determined based on the adaptive control parameters from the lookup table. In some embodiments, a safety coefficient may be applied to the control parameters as final control parameters.

In some embodiments, one or more processors may be configured to calculate the moment of inertia and determine the adaptive control parameters. In some embodiments, the one or more processors may be a programmable processor (e.g., a central processing unit (CPU) or a microcontroller), a field programmable gate array (FPGA) and/or one or more ARM processors. In some embodiments, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). In some embodiments, the lookup table 509 may be stored within the memory units of the non-transitory computer readable medium. In some embodiments, data from the motion or location sensors can be directly conveyed to and stored within the memory units of the non-transitory computer readable medium. The memory units of the non-transitory computer readable medium can store logic, code and/or program instructions executable by the one or more processors to perform any suitable embodiment of the methods described herein. For example, the one or more processors can be configured to execute instructions to calculate the moment of inertia of the carrier as discussed herein. In other example, the one or more processors can be configured to generate input signal to be supplied to the one or more actuators. In some embodiments, the memory units of the non-transitory computer readable medium can be used to store the adaptive control parameters determined by the one or more processors.

In a separate yet related aspect, the present disclosure provides an apparatus for controlling a carrier that is configured to support a plurality of different types of payload. In practicing, the apparatus may comprise one or more processors that are individually or collectively configured to: obtain at least one motion characteristic of the carrier when the carrier is supporting a type of payload from said plurality, wherein said motion characteristic is indicative of the type of payload being supported by the carrier; and select a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

In another aspect, the present disclosure provides a system for controlling a carrier configured to support a plurality of different types of payload. The system comprises: a movable object; the carrier being configured to operably couple a type of payload from said plurality of different types to the movable object; and one or more processors that are, individually or collectively, configured to:
obtain at least one motion characteristic of the carrier when the carrier is supporting the type of payload from said plurality, wherein said motion characteristic is indicative of the type of payload being supported by the carrier; and select a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

Figure 6:
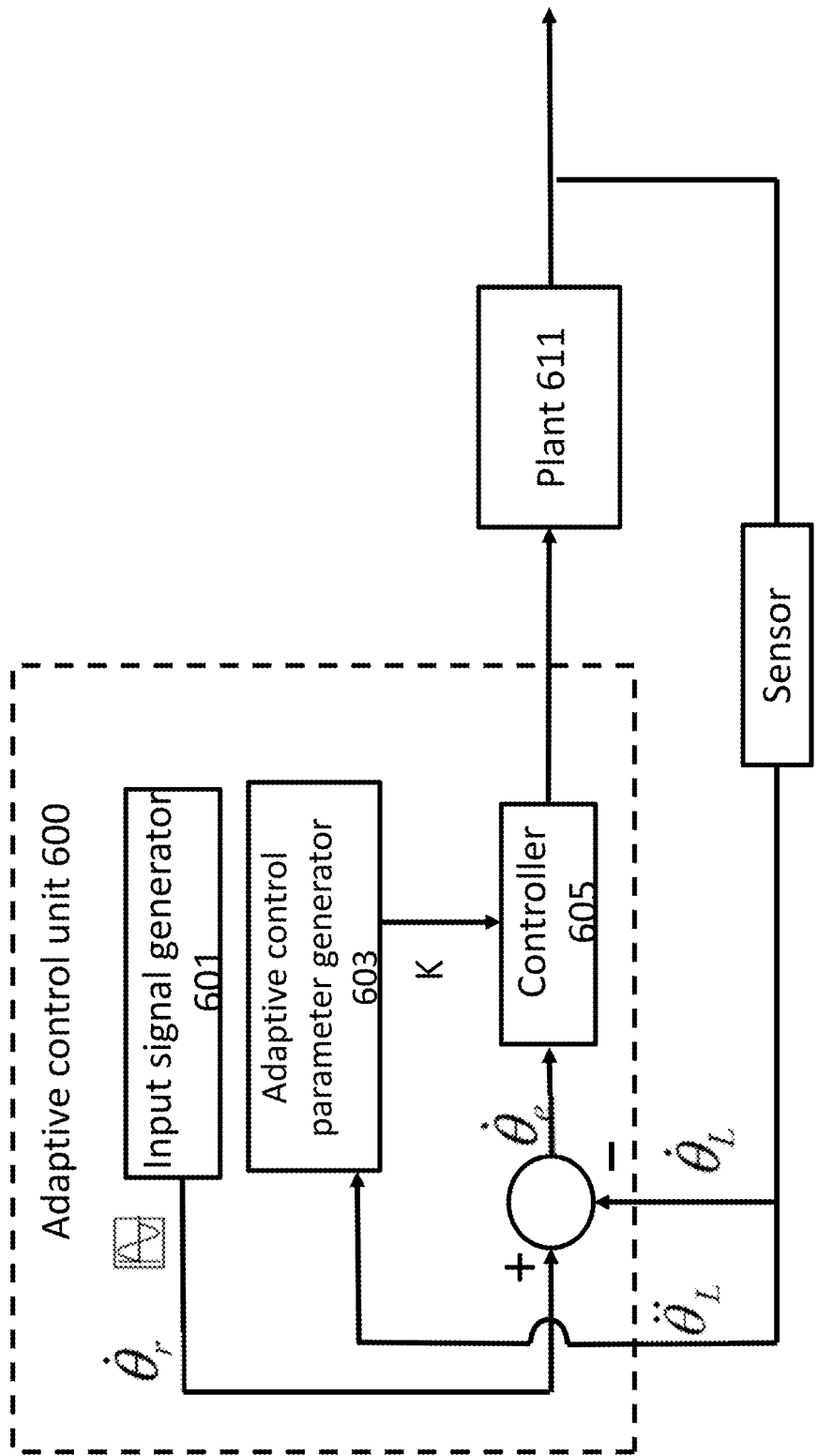
FIG. 6 shows another example of an adaptive control scheme that may be implemented in a carrier, in accordance with an embodiment of the disclosure.

FIG. 6 shows another example of an adaptive control scheme that may be implemented in a carrier platform, in accordance with an embodiment of the disclosure. In some embodiments, the adaptive control parameters may be determined based on a vibration motion of the carrier. In some embodiments, by analyzing the frequency response of one or more process variables in a closed control loop of the carrier or gimbal system, a type of the payload may be assessed. In some embodiments, the process variables may include angular velocity of the carrier and/or angular acceleration of the carrier. In some embodiments, the analysis of the variables can be carried through examination of a frequency response of the one or more variables. In other embodiments, time response of the process variables may be analyzed to determine the adaptive control parameters.

As shown in FIG. 6, an adaptive control unit 600 may be provided to control a carrier actuated by one or more actuators. In FIG. 6, a plant 611 may include a carrier and the actuator(s). In some embodiments, the adaptive control unit 600 may include an input signal generator 601, an adaptive control parameter generator 603 and a controller 605.

In some embodiments, a vibration motion of the carrier may be caused in response to an input signal with varying frequencies.

In some embodiments, the input signal generator 601 may be configured to generate a variety of set point signals with varying frequency to direct the angular velocity of the carrier. In some embodiments, the varying frequency signal may be sinusoidal signals with frequencies varying from f0-fn. The start and end frequency can be set in a wide range. For example, the start frequency may be below 1 Hz and the ending frequency can be above 20,000 Hz. The incremental step can be set by any percentage, such as 3%, 4%, 5% etc. In other embodiments, instead of a sine signal, a random signal with varying frequency may be used.

The input signal generator 601 may be implemented in any or a combination of the following technologies, which are all well known in the art: discrete electronic components, discrete logic circuits having logic gates for implementing logic functions upon data signals, an application specific integrated circuit having appropriate logic gates, a programmable gate array(s), a field programmable gate array (FPGA), etc. The synchronization unit is not limited to any particular firmware, or software configuration.

In the case of a sine frequency sweep, the frequency response of angular velocity of the carrier may be analyzed by the adaptive control parameter generator 603. In some embodiments, stability of the system may be examined. There are a variety of methods can be used for identifying stability of a system. For example, overshoot of the amplitude response, phase margin, peak resonance and oscillation, etc. may be examined to detect instability of the system. In some embodiments, the amplitude response at a peak resonance may be checked to see if it exceeds a safety value during a sine sweep process. For example, if excessive peak amplitude is detected at resonance frequency, it may be indicative of instability of the system.

In another embodiment, the frequency response of angular acceleration of the carrier may be analyzed by the adaptive control parameter generator 603. As explained previously, in a gimbal or carrier platform, the angular acceleration of the carrier may be correlated with the moment of inertia of the carrier. In some embodiments, when the moment of inertia of the carrier changes the angular acceleration response may have an inverse proportional change. From empirical experiment data, there exists evidence showing that the optimal setting of a proportional gain of a PID controller may also have a linear or non-linear relationship with the moment of inertia. Therefore, a ratio of a new set of control parameters to a previous set of control parameters can be determined based on the ratio of the new angular acceleration response to a previous angular acceleration response. For example, the ratio of the current amplitude of angular acceleration to a previous angular acceleration is kj=anew/aold, then the corresponding ratio of a new control parameter to an old control parameter may be represented as $K_j=K_{new}/K_{old}$, where $K_j$=kj*constant. The constant may be determined empirically. In some embodiments, the constant need not be identified. In other embodiments, the relationship between $K_j$ and $k_j$ may not be linear. In both situations, a lookup table may be employed to store the relationship between the control parameter and amplitude of the angular acceleration.

It should be noted that various measurement types of frequency response of the system may be examined to identify the adaptive control parameter. For example, instead of studying a closed loop control system, the frequency response of an open loop, plant or controller can be examined for identifying the optimal control parameters.

In another aspect, the present disclosure provides a method for controlling a carrier configured to support a plurality of different types of payload. In practicing, the method may comprise: obtaining at least one motion characteristic of the carrier when the carrier is supporting a type of payload from said plurality, wherein said motion characteristic is indicative of the type of payload being supported by the carrier; and selecting a set of control parameter(s) from a plurality of different sets of control parameter(s) based on said motion characteristic, wherein the selected set of control parameter(s) is suitable for controlling movement of the carrier for the type of payload being supported by the carrier, and wherein each individual set of control parameter(s) is suitable for controlling the carrier that supports a type of payload that is different from another payload in said plurality of payloads.

In a separate yet related aspect, the present disclosure provides a non-transitory computer-readable medium storing instructions that, when executed, causes a computer to perform a method for controlling a carrier configured to support a plurality of different types of payload. In practicing, the method comprises: obtaining at least one motion characteristic of the carrier when the carrier is supporting a type of payload from said plurality, wherein said motion characteristic is indicative of the type of payload being supported by the carrier; and selecting a set of control parameter(s) from a plurality of different sets of control parameter(s) based on said motion characteristic, wherein the selected set of control parameter(s) is suitable for controlling movement of the carrier for the type of payload being supported by the carrier, and wherein individual sets of control parameter(s) in said plurality of control parameter(s) are suitable for controlling the carrier when supporting the different types of payload.

Figure 7:
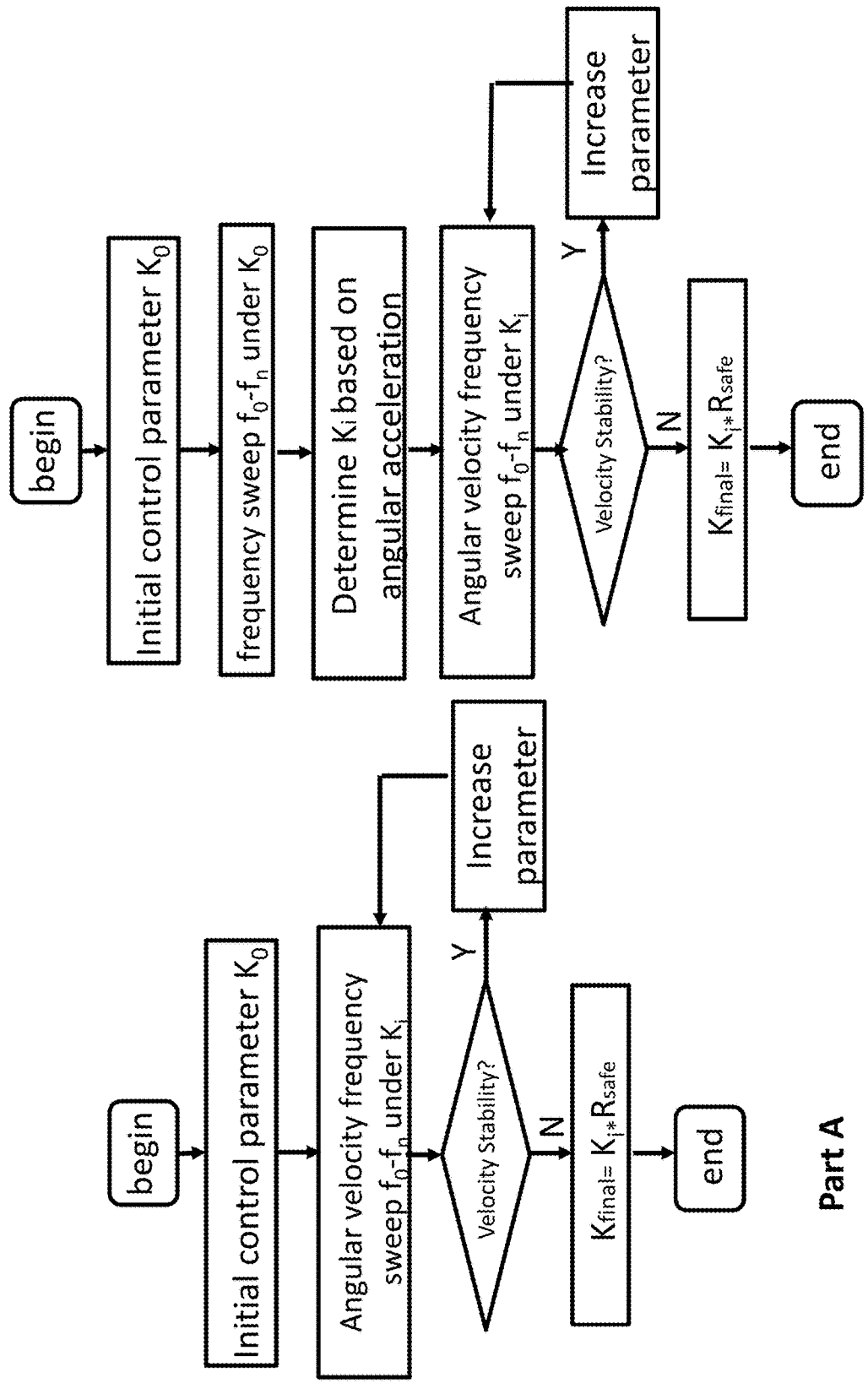
FIG. 7 illustrates exemplary processes for determining adaptive control parameters, in accordance with some embodiments.

FIG. 7 shows examples for determining adaptive parameters of a PID control loop. In the example, the proportional gain of a control loop is determined using the method as described herein. However, other parameters can also be determined using the same method. It is known that the proportional gain affects all frequencies (unlike integral and derivative action), since frequencies between the low range where integral action dominates and high frequencies where derivative action dominates can only be affected by the proportional gain. This middle frequency range is critical in rejecting disturbances. In some embodiments, one or more control parameters may be adjusted simultaneously.

As shown in FIG. 7 part A, adaptive control parameters used in a PID (PD, PI could also be used) loop to control the angular velocity of a plant with unknown types may be determined. In some embodiments, the angular velocity may be measured and fed back to the controller to control a rotational movement of a carrier or a gimbal about one or more axes, such as roll, pitch and/or yaw-axis. One or more sensors such as IMU or gyroscope may be used to measure the process variable (i.e. angular velocity).

In some embodiments, an initial set of control parameters $K_0$ may be assigned to the system. In some embodiments, the initial control parameters may be set at a small value which may not cause risk such as uncontrollable oscillation to the system. Under this initial set of control parameters, a sine frequency sweep may be applied to the system and the angular velocity of the carrier may be examined. In some embodiments, the frequency range may be from $f_0$ to $f_n$. The range of frequency sweep may vary according to the specific variable to be controlled and the parameter of the controller to be designed. During one round of the sweep, stability of the system in terms of the frequency response of the angular velocity may be examined. In some embodiments, the amplitude of the frequency response may be examined as described elsewhere herein. If there is no indication of instability, the control parameters may be increased to a new value and the sweep process is repeated.

In some embodiments, a plurality of different sets of control parameters are obtained by adjusting one or more parameters from the set of reference (initial) control parameters. In some embodiments, the control parameters may be increased to a new value at each iteration. In some embodiments, the incremental step of the control parameters may be pre-determined such as fixed step. In other embodiments, the step may be variable steps such that the control parameters may be increased linearly or non-linearly.

In some embodiments, the vibration motion of the carrier changes as the one or more parameters from the set of reference control parameters being adjusted. In some cases, instability of a system may indicate a vibration motion. If instability of the system is detected, the current control parameters may be set as the adaptive control parameters.

In some embodiments, the adaptive control parameters may be determined by an additional safe factor such that the final adaptive control parameters may be represented as $K_{final}=K_i*R_{safe}$. In some cases, the safe factor can be pre-determined by a user.

Alternatively, the adaptive control parameters may be determined in a process as shown in FIG. 7 part B. In some cases, a set of adaptive control parameters may be pre-obtained as reference control parameters for a carrier or gimbal system such as using the process in part A, and a new set of control parameters may need to be determined due to a payload change. In this case, the previously used adaptive control parameters may be set as the initial control parameters $K_0$ in Part B. Similar to the process illustrated in part A, a sine frequency sweep may be applied to the system in the range of $f_0$-$f_n$ under $K_0$. A frequency response of angular acceleration of the carrier may be examined. In some embodiments, the angular acceleration may be obtained from a sensor such as an IMU or gyroscope.

In some embodiments, the amplitude of the angular acceleration may be obtained and the ratio of the amplitude of the current angular acceleration to the amplitude of the previous angular acceleration may be calculated. For example, the ratio may be represented as $k_j=a_i/a_0$ where the amplitude of the current angular acceleration is denoted as $a_i$ and the amplitude of the previous angular acceleration is denoted as $a_0$. As described previously herein, the control parameters may have a proportional relationship with the angular acceleration, thus the new set of control parameters may be determined by $K_i=K_0*K_j$ and $K_j=k_j*Constant$. In some embodiments, the constant may be determined from empirical data. In other embodiments, according to various ways to model of the system, the relationship of the control parameters and angular acceleration may not be represented analytically and a lookup table may be used to store the relationship. Once the new set of control parameters Ku are determined using the angular acceleration data, the rest of the process in part B may be similar to the process as described in part A.

In another aspect of the present disclosure, a method for detecting a payload on a carrier configured to support the payload is provided. In some embodiments, the method comprises obtaining a coupling state between the carrier and the payload using one or more sensors; and assessing the coupling state between the carrier and the payload based on the data from the one or more sensors, wherein assessing the coupling state comprises assessing (a) whether the payload is coupled to the carrier, and/or (2) whether the payload is correctly mounted.

In a separate yet related aspect of the disclosure, an apparatus for detecting a payload on a carrier configured to support the payload may be provided. The apparatus comprises one or more processors that are individually or collectively configured to: obtain a coupling state between the carrier and the payload using one or more sensors; and assess the coupling state between the carrier and the payload based on the data from the one or more sensors, wherein assessing the coupling state comprises assessing (a) whether the payload is coupled to the carrier, and/or (2) whether the payload is correctly mounted.

In another aspect, the present disclosure provides a system for detecting a payload on a carrier configured to support the payload may be provided. In practicing, the system comprises: a movable object; the carrier being configured to operably couple the payload to the movable object; and one or more processors that are, individually or collectively, configured to: obtain a coupling state between the carrier and the payload using one or more sensors; and assess the coupling state between the carrier and the payload based on the data from the one or more sensors, wherein assessing the coupling state comprises assessing (a) whether the payload is coupled to the carrier, and/or (2) whether the payload is correctly mounted.

In some embodiments, the coupling state between the carrier and the payload is automatically assessed with aid of one or more processors without any user input.

Figure 8:
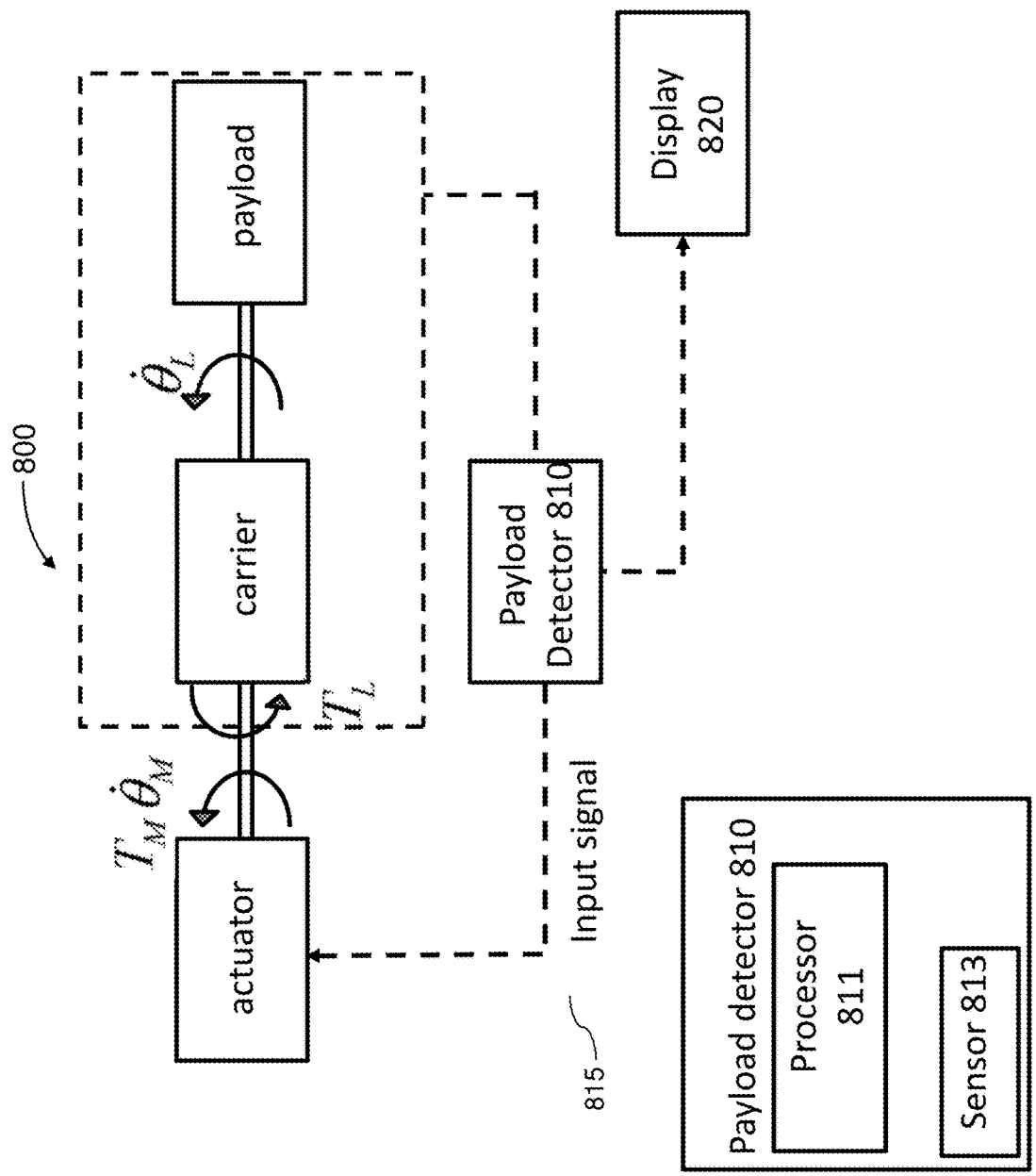
FIG. 8 illustrates an exemplary block diagram of a carrier comprising a payload detector, in accordance with embodiments.

FIG. 8 illustrates an exemplary block diagram of a carrier comprising a payload detector, in accordance with embodiments. In some embodiments, the carrier or gimbal platform may correspond to the system in FIG. 3 and the plant 611 in FIG. 6. As shown in FIG. 8, the payload detector 810 may be configured to detect a presence of a payload and/or mounting configuration of a payload. In some cases, the presented method and apparatus may be able to avoid damage to the actuators due to improper mounting of the payload.

In some embodiments, a coupling state of the payload to the carrier and/or mounting configuration can be detected by the payload detector 810. In some embodiments, the coupling state may refer to whether a payload is mounted to a carrier or gimbal system or not. In some situations, it may be critical to know whether a payload is installed before a controller is switched on to control or stabilize the carrier. Operating a controller designed for controlling movement of a payload with certain moment of inertia may be dangerous in the absence of payload (uncontrollable oscillation of the system). Similarly, damage to the actuators may also occur caused by excessive moment of inertia of the payload due to improper mounting configuration as described previously in FIG. 2. In some embodiments, the mounting configuration may refer to one or more dynamic or static characteristics of the payload/carrier. For example, the characteristics may include a moment of inertia of the carrier about an axis (e.g., roll-axis, pitch-axis, yaw-axis), location of a mass center in one or more directions, position of the payload relative to the carrier, etc.

In some embodiments, assessing whether the payload is coupled to the carrier may comprise comparing the at least one motion characteristic of the carrier to a predefined motion characteristic of the carrier. In some embodiments, moment of inertia of the carrier may be measured for assessing the coupling state. In some embodiments, the payload detector 810 may be configured to generate an input signal 815 supplied to one or more actuators to cause movement of the carrier or gimbal system, then one or more motion characteristics of the carrier in response to the input signal may be examined. In some instances, the input signal 815 may be a low power signal that may not cause danger to the system such as oscillation. Accordingly, moment of inertia of the carrier may be calculated based on a response to the input signal. In some embodiments, an angular acceleration response of the actuator and the carrier may be examined such that the moment of inertia can be obtained as described previously herein.

In some embodiments, the payload detector 810 may include one or more processors 811 that are configured to assess the mounting position and coupling state of the payload based on one or more motion characteristics of the carrier. In some embodiments, assessing the mounting position of the payload may comprise comparing the at least one motion characteristic of the carrier to a plurality of different motion characteristic models of the carrier.

In some embodiments, the one or more processor 811 may be able to calculate the current moment of inertia about a specific axis and compare it to a predetermined range. It the calculated value exceeds the range, it may be indicative of an improper mounting position in the specific direction. Optionally, the moment of inertia may be compared to a predefined threshold, if the value is identified to be lower than the threshold, it may be indicative of no payload is coupled to the carrier. In some embodiments, the threshold may be predefined when the carrier is not coupled with a payload.

In some embodiments, moment of inertia resides outside of the range may lead to a poor control performance regardless of selection of control parameters or at an expensive cost of a controller. The range may be determined empirically, analytically or from simulation. If the current moment of inertia exceeds the range, the one or more processors may be configured to output a result indicative of an improper mounting of the payload in the corresponding direction. For example, if the moment of inertia about a roll axis is identified to be higher than a pre-determined upper limit, the one or more processors 811 may be configured to generate a result indicating an excessive payload is detected in the roll axis direction. In another example, if the moment of inertia is detected as zero, the output result may indicate that no payload is mounted to the carrier. In some embodiments, a control operation may not be carried if improper mounting configuration is detected.

In other embodiments, other characteristics of motion may be used to assess the mounting position and coupling state. For instance, a signal may be applied to the carrier, then the angular velocity or angular acceleration of the carrier in response to the signal may be obtained and analyzed. In some embodiments, the dynamic performance of an open loop system may be examined. In some embodiments, the frequency response of the angular velocity or angular acceleration may be examined and compared to a predefined angular acceleration or angular velocity of the carrier. For example, the payload may be detected as not coupled to the carrier when the angular acceleration response of the carrier matches the predefined angular acceleration response of the carrier. In another example, the payload may be detected as coupled to the carrier when the angular acceleration response of the carrier does not match the predefined angular acceleration response of the carrier. In some embodiments, the predefined value may be obtained when the carrier is excited by the same signal without coupling to any payload. In some embodiments, the input signal applied to the carrier may have a preassessed frequency and/or amplitude such that a variety of characteristics of the frequency response can be used for comparison such as the amplitude of the output signal.

In some embodiments, the one or more processors may be a programmable processor (e.g., a central processing unit (CPU) or a microcontroller), a field programmable gate array (FPGA) and/or one or more ARM processors. In some embodiments, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). In some embodiments, the specification of the motor and the system that may be required for calculation of the moment of inertia may be stored within the memory units of the non-transitory computer readable medium. In some embodiments, data from the motion or location sensors can be directly conveyed to and stored within the memory units of the non-transitory computer readable medium. The memory units of the non-transitory computer readable medium can store logic, code and/or program instructions executable by the one or more processors to perform any suitable embodiment of the methods described herein. For example, the one or more processors can be configured to execute instructions to calculate the moment of inertia of the carrier as discussed herein. In other example, the one or more processors can be configured to generate input signal to be supplied to the one or more actuators. In some embodiments, the memory units of the non-transitory computer readable medium can be used to store the adaptive control parameters determined by the one or more processors.

In some embodiments, the angular acceleration may be measured by one or more sensors located on the carrier. In some embodiments, the sensors may be the same sensors used in a control system of the carrier such as an inertial sensor (e.g. IMU or gyroscope). The one or more sensors may be operatively coupled to the one or more processors 811.

In other embodiments, in addition to using the motion characteristics of the carrier, the coupling state and mounting position may be assessed using sensors 813 to detect one or more static physical characteristics of the payload with respect to the carrier.

The one or more physical characteristics may be assessed when the carrier is static. The one or more physical characteristics may include the position of the payload with respect to the carrier, the proximity of the payload to a reference point of the carrier, the mass of the payload, the mass distribution of the payload, whether a payload is coupled or attached to the carrier, and the like. The one or more physical characteristics may be acquired prior to the acquisition of the motion characteristics, concurrent with or after the motion characteristics acquisition. In some embodiments, the term physical characteristics may refer to positional characteristics and may be interchangeably used throughout this description.

In some embodiments, the payload detector 810 may include additional sensor(s) 813 to assess the coupling state. In some embodiments, the sensor(s) 813 may be position detection sensors located on the carrier. In some examples, the sensor(s) can be one or more proximity sensor configured to detect a distance between the payload and the carrier such that the mounting position of the payload with respect to the carrier may be identified. In this case, the one or more processors 811 may be able to process the position of the payload and output the mounting configuration result with indications whether the payload is properly mounted or not. In other examples, the sensor(s) can be a mass sensor configured to detect a mass of the carrier. By comparison of the current mass and a predefined mass, the coupling state of a payload may be identified. In another example, the position detection sensor may comprise a photoelectric sensor and/or touch sensing switch to detect the presence of a payload. For instance, the touch sensing switch may be triggered when a payload is coupled to the carrier such that further carrier control may be performed.

In some embodiments, the sensor(s) 813 may be used to detect whether a payload is coupled to the carrier when the carrier is static. In some cases, the detection may be performed prior to the motion characteristics of the carrier acquired by the inertial sensors. For instance, prior to the one or more motion characteristics of the carrier is measured, the sensor(s) 813 may be used to detect an existence of a payload. If no payload is detected to be coupled to the carrier, further process of payload detection based on motion characteristics may or may not be continued.

In some embodiments, when the carrier is detected to be not coupled to any payload, the carrier may be set to a low power consumption mode. The low power consumption mode may include lower the power consumption of one or more motors that actuate the carrier. For example, one or more motors may be disabled or set to output a small torque when no payload is detected to be coupled to the carrier. The low power consumption mode may include lower the power consumption of one or more sensors of the carrier. For example, one or more sensors such as the IMU, GPS may be disabled or set to operate at a lower frequency when no payload is detected to be coupled to the carrier.

Optionally, the sensor(s) 813 may be used to supply additional mounting configuration information after one or more motion characteristics of the carrier is assessed. For instance, the mounting configuration about one gimbal axis may be detected to be improper (e.g., exceeding a predetermined range) based on the motion characteristics of the carrier. In this case, the sensors(s) 813 may be used to further identity if the improper mounting configuration is due to an unbalanced mounting position using proximity sensors or an oversize/weight payload using the mass sensors. In some cases, the sensor(s) 813 may be used to guide users adjust the mounting position of the payload along a specific direction.

Alternatively, the sensor(s) 813 may be used as a stand-alone payload detector to detect a coupling state. The coupling state may include at least whether a payload is coupled to the carrier. The coupling state may be assessed without generating an input signal. The coupling state may be assessed when the carrier is static. Further control operations based on motion characteristics analysis may be performed if the payload is detected to be coupled to the carrier.

In some embodiments, the one or more processors 811 may be configured to further generate a result of mounting configurations that are indicative of the coupling state and transmit the result to a display 820. The display 820 may be configured to receive/transmit data with the payload detector. Any suitable means of communication can be used, such as wired communication or wireless communication. The transmitted data may include the coupling state of the payload to the carrier and/or mounting configurations of the payload. In some embodiments, the data may include the information about whether a payload is coupled to the carrier, whether a payload is coupled to a carrier in a proper mounting position and/or the current mounting position of a payload. In some embodiments, the one or more processors may be configured to output an instruction to prompt the user install a payload properly. In some embodiments, a control function may not be operated if either improper mounting configuration is detected or the coupling state indicates no payload is coupled to the carrier.

Figure 9:
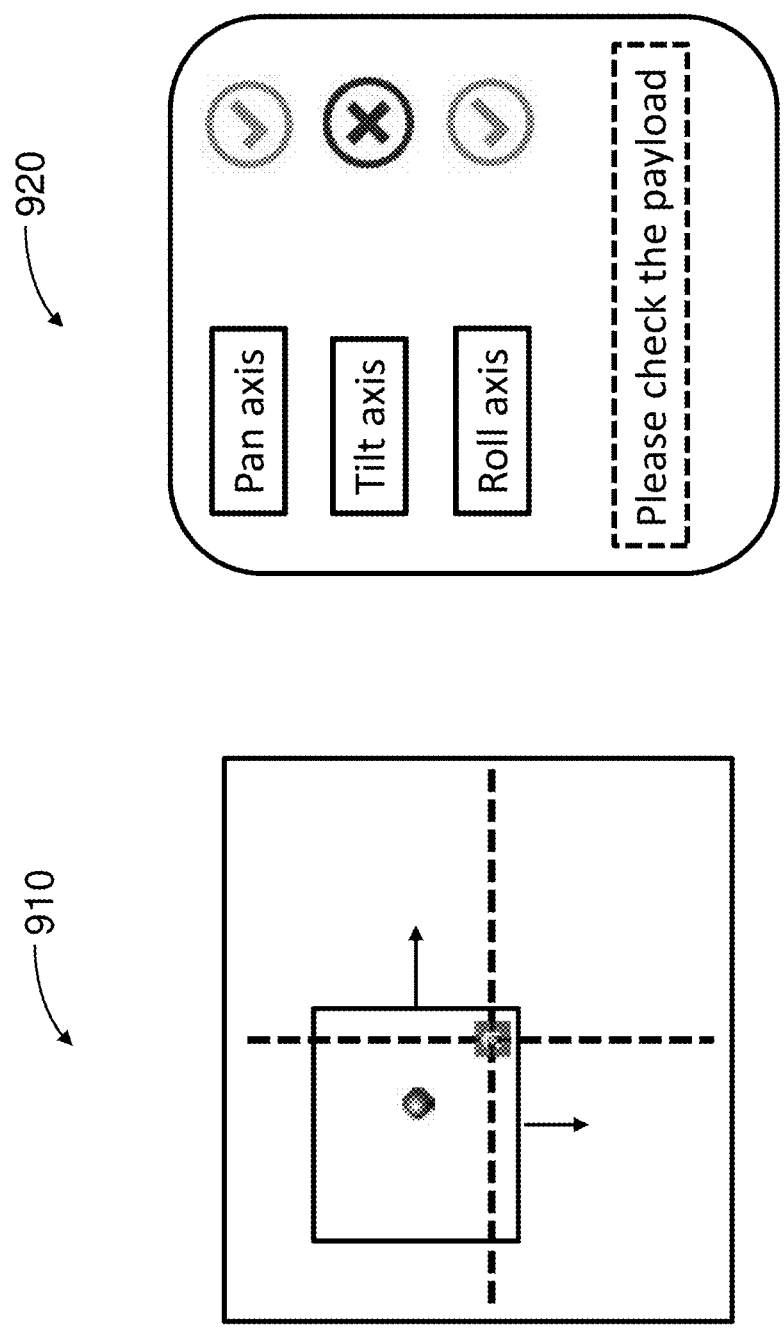
FIG. 9 shows examples of coupling states displayed on a display device, in accordance with some embodiments.

FIG. 9 shows examples of coupling states displayed on a display device, in accordance with some embodiments. In some embodiments, a position of the current center of the payload may be displayed and an instruction that prompts a user to adjust the position to a predefined mounting position may be provided 910. For example, shown as 910, the user may be prompted to adjust the payload in one or more directions. Alternatively, indications of the coupling state and/or mounting configuration may be displayed to the user 920. For example, if the coupling state of a payload is identified as no payload, a message may be displayed to the user on the display to prompt the user to check the installation. In another example, if the moment of inertia of the carrier about an axis is detected to exceed a predefined range, an indication may be displayed to the user to prompt the user check the mounting configuration about that direction. In some embodiments, the control function used to control or stabilize the carrier may be disabled until a payload is detected or the mounting configuration is detected to be within a predetermined range. It should be noted that any suitable means may be used to prompt the user, such as message, GUI or audible prompt.

In some embodiments, the display may be configured to show a user interface (UI) or a graphical user interface (GUI) rendered through an application (e.g., via an application programming interface (API) executed on the user device) on a device operably coupled to the payload detector. The display may project a message to the user in the application to prompt adjusting the mounting position of the payload, check the installation of the payload, or check the installation of the payload about a specific axis/direction. In some embodiments, the display may be able to allow users to visualize the current mounting position of the payload. In some embodiments, the display may be located on the carrier or gimbal platform. Optionally, the display may be located on an external device remotely accessible to the carrier or gimbal platform.

In another aspect of the present disclosure, a method of determining adaptive control parameters for a carrier platform may be provided. In some embodiments, the method may comprise verifying a proper mounting configuration of a payload by identifying one or more physical characteristics of the payload; and determining the adaptive control parameters based on the physical characteristics.

Figure 10:
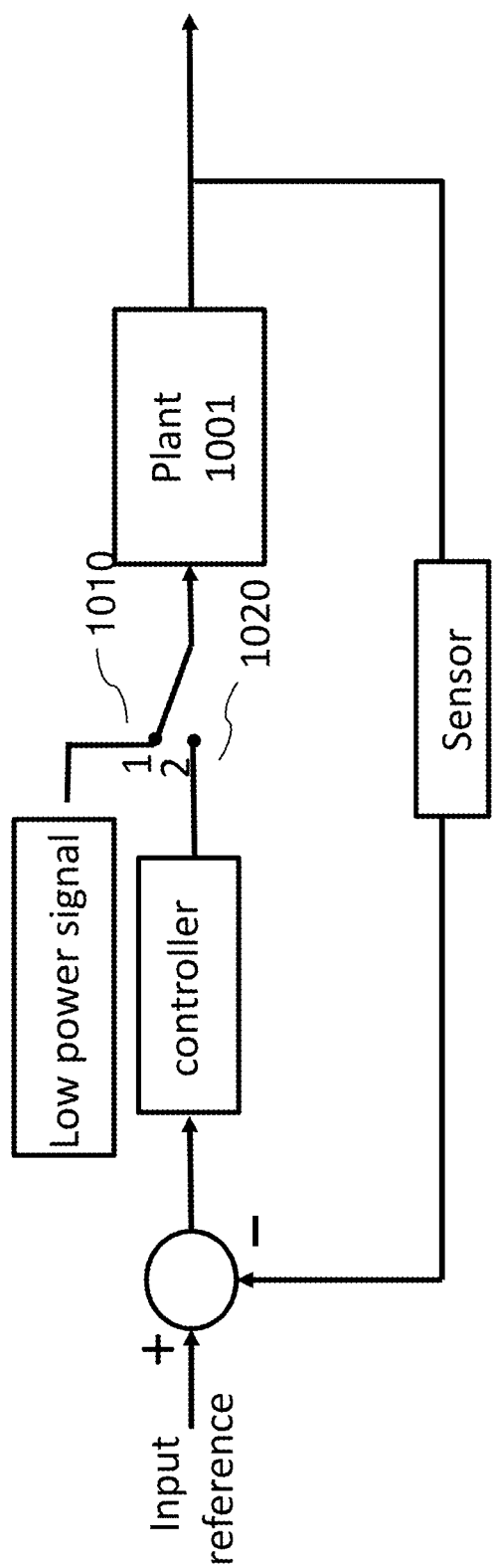
FIG. 10 illustrates an example of a control scheme in accordance with some embodiments.

FIG. 10 shows an example of a control scheme in accordance with some embodiments. As shown in the figure, the plant 1001 may refer to one or more actuators and a carrier or gimbal platform. In process 1, the mounting configuration of the payload may be detected using the methods described previously. In some embodiments, the mounting configuration of the payload may include one or more physical characteristics of the carrier such as the moment of inertia of the carrier. In some embodiments, the moment of inertia of the can be obtained by examination of the angular acceleration of the carrier in response to a low power signal as described in FIG. 5. The moment of inertia of the carrier may be used to verify if the payload is mounted properly. In some embodiments, the moment of inertia of the carrier can be used to determine a set of adaptive control parameters using the methods described previously. In some embodiments, the set of adaptive control parameters determined in process 1 may be used as the final control parameters in process 2. In other embodiments, the set of adaptive control parameters determined in process 1 can be used as the initial set of parameters (correspond to $K_0$ in FIG. 7) for process 2. If the mounting configuration of the payload is verified to be within a predefined range, the system may proceed to process 2. In process 2, the adaptive control parameters may be determined using the methods described in FIG. 7 with or without using the adaptive control parameters determined from process 1. In other embodiments, the adaptive control parameters determined from process 1 may be used for the controller directly.

One or more processors may be configured to identify the coupling state and/or mounting configuration of the payload, and may calculate a set of adaptive control parameters in process 1. In some embodiments, the one or more processors may be configured to determine the adaptive control parameters using the methods discussed elsewhere. In some embodiments, the one or more processors may be a programmable processor (e.g., a central processing unit (CPU) or a microcontroller), a field programmable gate array (FPGA) and/or one or more ARM processors. In some embodiments, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). In some embodiments, the specification of the motor and the system that may be required for calculation of the moment of inertia may be stored within the memory units of the non-transitory computer readable medium. In some embodiments, a lookup table that contains a relationship between control parameters and one or more physical characteristics of the carrier may be stored within the memory units. In some embodiments, data from the motion or location sensors can be directly conveyed to and stored within the memory units of the non-transitory computer readable medium. The memory units of the non-transitory computer readable medium can store logic, code and/or program instructions executable by the one or more processors to perform any suitable embodiment of the methods described herein. For example, the one or more processors can be configured to execute instructions to calculate the moment of inertia of the carrier as discussed herein. In other example, the one or more processors can be configured to generate input signal to be supplied to the one or more actuators. In some embodiments, the memory units of the non-transitory computer readable medium can be used to store sets of adaptive control parameters determined by the one or more processors or from any other means.

Figure 11:
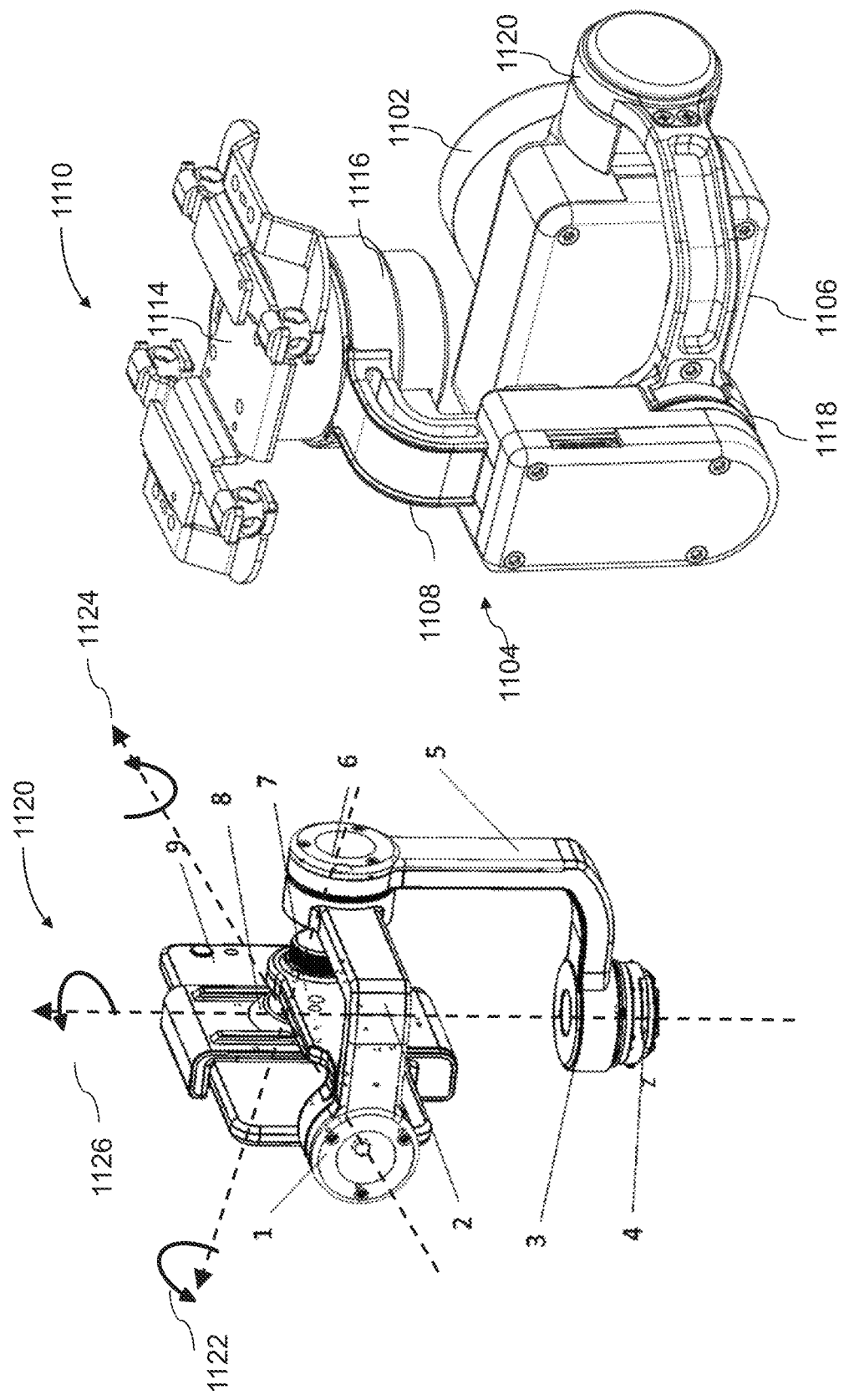
FIG. 11 illustrates exemplary apparatus for controlling/stabilizing various payloads, in accordance with some embodiments.

FIG. 11 illustrates examples of apparatus for controlling or stabilizing payloads 9 and 1102, in accordance with some embodiments. The elements of the apparatus 1120 or 1110 can be used in combination with any of the systems, devices, and methods described herein. The apparatus 1110 can be carried by a movable object (not shown), such as a UAV. The apparatus 1120 can be a hand-held device carried by a human. The apparatus 1120 or 1110 includes a carrier which is coupled to the payload 9 or 1102.

In the depicted embodiment 1110, the carrier 1104 includes a first frame 1106 affixed to the payload 1102 and a second frame 1108 coupled to the first frame 1106. In the depicted embodiment 1110, the second frame 1108 is a yaw frame that is actuated by a yaw actuator 1116 in order to rotate the carrier 1104 and coupled payload 1102 about a yaw axis, and the first frame 1106 is a roll frame that is actuated by a roll actuator 1118 in order to rotate the carrier 1104 and coupled payload 1102 about a roll axis. The carrier 1104 can also include a pitch actuator 1120 configured to rotate the payload 1102 about a pitch axis. The actuators 1116, 1118, and 1120 can each apply a torque to rotate the respective frame or payload about the corresponding axis of rotation. Each actuator can be a motor including a rotor and a stator. For instance, the yaw actuator 1116 can include a rotor coupled to the yaw frame (second frame 1108) and a stator coupled to the movable object (not shown), or vice-versa. However, it shall be appreciated that alternative configurations of the carrier can also be used (e.g., less than or more than two frames, the second frame 1108 may be a pitch frame or a roll frame rather than a yaw frame, the first frame may be a yaw frame or a pitch frame rather than a roll frame, a separate pitch frame can be provided to coupled rotate the payload about a pitch axis, etc.).

In the depicted embodiment 1120 and 1 may be an actuator to rotate the carrier about a Y-axis 1124 and 7 may be a Y-axis shaft arm. 3 may be an actuator to rotate the carrier about a Z-axis 1126 and 5 is the Z-axis shaft arm. 6 may be an actuator to rotate the carrier about a X-axis 1122 and 2 is the Z-axis shaft arm. One or more sensors such as inertial measurement unit may be located on the shaft arms of the carrier. 8 may be a support that is configured to connect the payload 9 to the carrier.

In some embodiments, one or more position detection sensors may be located on the carrier to assess a coupling state as previously described herein. The one or more position detection sensors can be the same as described in FIG. 8. The sensors may be installed on any suitable position on the carrier such as the Y-axis shaft arm 7. For instance, a proximity sensor may be located on the Y-axis shaft arm 7 to detect whether the payload 9 is coupled to the carrier 1120.

As discussed above and herein, the carrier can be used to control the spatial disposition (e.g., position and/or orientation) of a coupled payload. For instance, the carrier can be used to move (e.g., translate and/or rotate) the payload to a desired spatial disposition. The desired spatial disposition can be manually input by a user (e.g., via remote terminal or other external device in communication with the movable object, carrier, and/or payload), determined autonomously without requiring user input (e.g., by one or more processors of the movable object, carrier, and/or payload), or determined semi-autonomously with aid of one or more processors of the movable object, carrier, and/or payload. The desired spatial disposition can be used to calculate a movement of the carrier or one or more components thereof (e.g., one or more frames) that would achieve the desired spatial disposition of the payload.

For example, in some embodiments, an input angle (e.g., a yaw angle) associated with a desired attitude of the payload is received by one or more processors (e.g., of the movable object, carrier, and/or payload). Based on the input angle, the one or more processors can determine an output torque to be applied to the carrier or one or more components thereof (e.g., a yaw frame) in order to achieve the desired attitude. The output torque can be determined in a variety of ways, such as using a feedback control loop. The feedback control loop can take the input angle as an input and output the output torque as an output. The feedback control loop can be implemented using one or more of a proportional (P) controller, a proportional-derivative (PD) controller, a proportional-integral (PI) controller, a proportional-integral-derivative (PID) controller, or combinations thereof.

The control parameters may be determined using the method described herein to accommodate various payloads. In some embodiments, before starting the control function, mounting position and coupling state of the payloads with respect to the carrier may be detected. In some embodiments, the payload detection may be operated during carrier initialization process. In some embodiments, the payload detection may be operated when the carrier is at home position. In other embodiments, the payload detection may be operated during a process when the carrier is moving from a random attitude/position to a home attitude/position.

One or more processors may be provided to determine the adaptive control parameters of the carrier and/or determine a mounting configuration and coupling state of the payloads.

The carrier or gimbal may be one-axis gimbal system or multi-axis gimbal system. One or more sensor may be included to measure the motion of the carrier. The sensor(s) can be any sensor suitable for obtaining data indicative of a spatial disposition (e.g., position, orientation, angle) and/or motion characteristic (e.g., translational (linear) velocity, angular velocity, translational (linear) acceleration, angular acceleration) of a payload, such as an inertial sensor. An inertial sensor may be used herein to refer a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three accelerometers can be used to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure angular acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

Some sensors can be mechanically coupled to the carrier such that the spatial disposition and/or motion of the carrier correspond to the spatial disposition and/or motion of the sensors. The sensor can be coupled to the carrier via a rigid coupling, such that the sensor does not move relative to the portion of the carrier to which it is attached. Alternatively, the coupling between the sensor and the carrier can permit movement of the sensor relative to the carrier. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the carrier comprises shock absorbers or dampers that reduce vibrations or other undesirable mechanical movements from being transmitted from the carrier to the sensor. Optionally, the sensor can be integrally formed with a portion of the carrier. Furthermore, the sensor can be electrically coupled with a portion of the carrier (e.g., processing unit, control system, data storage).

In some embodiments, the carrier is coupled to a movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being. The movable object is not limited to any type of motion or vibration, such as high frequency, medium frequency and low frequency vibration resulted from any actuation system. The motion the movable object may cause relevant movement of the carrier. In some embodiments, the present disclosure provides an adaptive control of the movement of the carrier such that the motion of the payload supported by the carrier may be stabilized or controlled.

Figure 13:
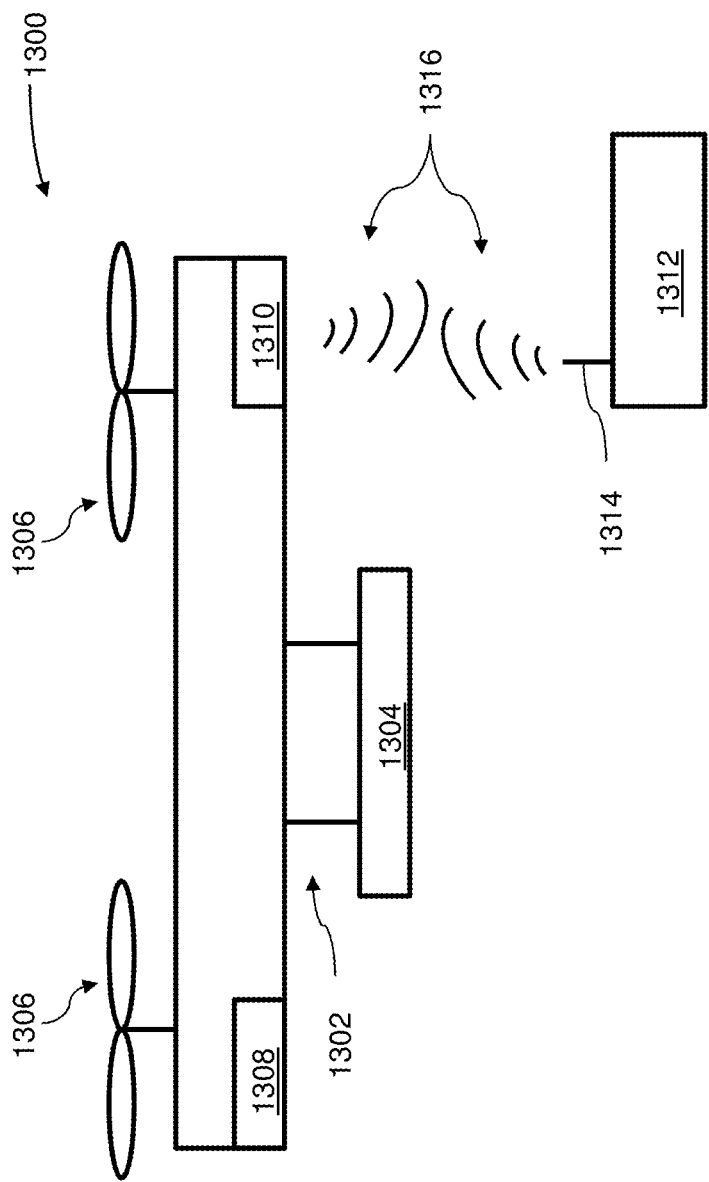
FIG. 13 illustrates a movable object including a carrier platform and a payload, in accordance with embodiments.

FIG. 13 illustrates a movable object 1300 including a carrier platform 1302 and a payload 1304, in accordance with embodiments. The carrier platform 1302 may include any of the exemplary carrier (e.g. gimbal) platforms previously described with reference to FIG. 12. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier platform 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like. The sensing system 1308 can also be used to sense the spatial disposition, velocity, and/or acceleration of the payload 1304 (e.g., with respect to up to three degrees of translation and up to three degrees of rotation).

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 112. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for detecting a payload on a carrier configured to support the payload, comprising:
   obtaining, through one or more inertial sensors at the carrier, at least one motion characteristic of the carrier, the at least one motion characteristic being indicative of a coupling state between the carrier and the payload; and
   assessing the coupling state between the carrier and the payload based on the at least one motion characteristic, including at least one of:
      assessing whether the payload is coupled to the carrier; or
      assessing whether the payload is correctly mounted at the carrier.

2. The method of claim 1, wherein assessing the coupling state further includes at least one of:
   automatically assessing, with aid of one or more processors without any user input, the coupling state between the carrier and the payload; or
   automatically assessing, with aid of the one or more processors and in response to the payload being supported by the carrier, the coupling state between the carrier and the payload.

3. The method of claim 1, wherein assessing whether the payload is coupled to the carrier includes:
   comparing the at least one motion characteristic of the carrier to a predefined motion characteristic of the carrier, the predefined motion characteristic of the carrier being associated with a state of the carrier without the payload.

4. The method of claim 3, further comprising:
   assessing that the payload is not coupled to the carrier in response to the at least one motion characteristic of the carrier matching the predefined motion characteristic of the carrier; or
   assessing that the payload is coupled to the carrier in response to the at least one motion characteristic of the carrier not matching the predefined motion characteristic of the carrier.

5. The method of claim 1, wherein obtaining the at least one motion characteristic of the carrier includes:
   obtaining, in response to a signal being applied to the carrier, the at least one motion characteristic of the carrier, the signal having at least one of a preassessed frequency or a preassessed amplitude.

6. The method of claim 5, wherein the carrier includes at least one motor, and the signal is augmented to an output torque of the at least one motor.

7. The method of claim 5, wherein:
   the at least one motion characteristic of the carrier includes an angular acceleration of the carrier; and
   assessing whether the payload is coupled to the carrier includes:
      comparing the angular acceleration of the carrier to a predefined angular acceleration response of the carrier, the predefined angular acceleration response of the carrier being associated with a state of the carrier without the payload; and
      assessing that the payload is coupled to the carrier in response to the angular acceleration response of the carrier not matching the predefined angular acceleration response of the carrier.

8. The method of claim 1, wherein assessing the coupling state between the carrier and the payload further includes:
   assessing a mounting position of the payload, including:
      comparing the at least one motion characteristic of the carrier to a plurality of different motion characteristic models of the carrier.

9. The method of claim 8, wherein the plurality of different motion characteristic models are indicative of the payload being coupled to the carrier in a plurality of different mounting positions.

10. The method of claim 8, wherein assessing the mounting position of the payload further includes:

selecting the mounting position from the plurality of different mounting positions in response to the at least one motion characteristic of the carrier matching one of the plurality of different motion characteristic models that corresponds to the selected mounting position.

11. The method of claim 10, wherein:
the at least one motion characteristic of the carrier includes an angular acceleration of the carrier; and
the plurality of different motion characteristic models include a plurality of different predefined angular acceleration responses of the carrier corresponding to the plurality of different mounting positions, respectively.

12. The method of claim 1, further comprising:
obtaining at least one physical characteristic of the payload, the at least one physical characteristic being indicative of the coupling state between the carrier and the payload;
wherein assessing the coupling state between the carrier and the payload further includes:
assessing the coupling state between the carrier and the payload based on the at least one motion characteristic and the at least one physical characteristic.

13. The method of claim 12, wherein the at least one physical characteristic includes at least one of:
a proximity of the payload relative to a reference point on the carrier;
a mass of the payload; or
a mass distribution of the payload.

14. The method of claim 12, wherein:
obtaining the at least one physical characteristic includes obtaining the at least one physical characteristic using one or more position detection sensors located on the carrier; and
assessing the coupling state between the carrier and the payload further includes at least one of:
assessing, by the one or more position detection sensors, whether the payload is coupled to the carrier prior to the one or more inertial sensors obtaining the at least one motion characteristic of the carrier; or
assessing, by the one or more position detection sensors, the mounting position of the payload after the one or more inertial sensors have obtained the at least one motion characteristic of the carrier.

15. The method of claim 14, wherein the one or more position detection sensors include at least one of:
a proximity sensor configured to detect a distance between the payload and the carrier;
a mass sensor configured to detect a mass of the carrier with or without the payload being coupled to the carrier;
a photoelectric sensor; or
a touch sensing switch.

16. The method of claim 1, further comprising:
generating a plurality of signals that are indicative of the coupling state.

17. The method of claim 16, wherein generating the plurality of signals includes at least one of:
generating a first signal in response to assessing that the payload is coupled to the carrier;
generating a second signal in response to assessing that the payload is not coupled to the carrier;
generating a third signal in response to assessing that the payload is coupled to the carrier in a predefined mounting position; or
generating a fourth signal in response to assessing that the payload is not coupled to the carrier in the predefined mounting position.

18. An apparatus for detecting a payload on a carrier configured to support the payload, the apparatus comprising one or more processors that are individually or collectively configured to:
obtain, through one or more inertial sensors at the carrier, at least one motion characteristic of the carrier, the at least one motion characteristic being indicative of a coupling state between the carrier and the payload; and
assess the coupling state between the carrier and the payload based on the at least one motion characteristic, including at least one of:
assessing whether the payload is coupled to the carrier; or
assessing whether the payload is correctly mounted at the carrier.

19. A system for detecting a payload on a carrier configured to support the payload, comprising:
a movable object;
the carrier configured to operably couple the payload to the movable object; and
one or more processors that are, individually or collectively, configured to:
obtain, through one or more inertial sensors at the carrier, at least one motion characteristic of the carrier, the at least one motion characteristic being indicative of a coupling state between the carrier and the payload; and
assess the coupling state between the carrier and the payload based on the at least one motion characteristic, including at least one of:
assessing whether the payload is coupled to the carrier; or
assessing whether the payload is correctly mounted at the carrier.

20. The method of claim 1, wherein the at least one motion characteristic includes at least one of an angular velocity of the carrier or an angular acceleration of the carrier.

* * * * *